(12) United States Patent
Zhou

(10) Patent No.: US 11,595,673 B2
(45) Date of Patent: Feb. 28, 2023

(54) LOW COMPLEXITY AFFINE MERGE MODE FOR VERSATILE VIDEO CODING

(71) Applicant: Avago Technologies International Sales Pte. Limited, Singapore (SG)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/004,782

(22) Filed: Aug. 27, 2020

(65) Prior Publication Data

US 2020/0396468 A1  Dec. 17, 2020

Related U.S. Application Data

(63) Continuation of application No. 16/453,672, filed on Jun. 26, 2019, now Pat. No. 10,798,394.

(60) Provisional application No. 62/724,464, filed on Aug. 29, 2018, provisional application No. 62/694,643, filed on Jul. 6, 2018, provisional application No. 62/690,583, filed on Jun. 27, 2018.

(51) Int. Cl.
| | |
|---|---|
| *H04N 11/02* | (2006.01) |
| *H04N 19/426* | (2014.01) |
| *H04N 19/176* | (2014.01) |
| *H04N 19/513* | (2014.01) |
| *H04N 19/105* | (2014.01) |
| *H04N 19/139* | (2014.01) |

(52) U.S. Cl.
CPC ......... *H04N 19/426* (2014.11); *H04N 19/105* (2014.11); *H04N 19/139* (2014.11); *H04N 19/176* (2014.11); *H04N 19/513* (2014.11)

(58) Field of Classification Search
CPC .................................................. H04N 19/426
USPC ....................................... 375/240.01–240.29
See application file for complete search history.

(56) References Cited

U.S. PATENT DOCUMENTS

| | | | |
|---|---|---|---|
| 4,894,774 A | 1/1990 | McCarthy et al. | |
| 4,905,147 A | 2/1990 | Logg | |
| 4,905,168 A | 2/1990 | McCarthy et al. | |
| 4,930,074 A | 5/1990 | McCarthy | |
| 5,233,421 A | 8/1993 | Chrisopher | |
| 5,469,223 A | 11/1995 | Kimura | |
| 9,088,796 B2 | 7/2015 | Misra et al. | |
| 9,426,498 B2* | 8/2016 | Zhang | H04N 21/234363 |
| 9,699,456 B2* | 7/2017 | Chien | H04N 19/11 |
| 10,462,488 B1 | 10/2019 | Li et al. | |
| 2002/0075273 A1 | 6/2002 | Marshall et al. | |
| 2013/0148734 A1* | 6/2013 | Nakamura | H04N 19/517 375/240.16 |
| 2013/0188716 A1* | 7/2013 | Seregin | H04N 19/56 375/240.16 |
| 2013/0287108 A1* | 10/2013 | Chen | H04N 19/52 375/240.16 |

(Continued)

FOREIGN PATENT DOCUMENTS

WO    WO-2017105097 A1 *  6/2017 ........... H04N 19/105

*Primary Examiner* — Leron Beck
(74) *Attorney, Agent, or Firm* — Foley & Lardner LLP

(57) ABSTRACT

In some aspects, the disclosure is directed to methods and systems for reducing memory utilization and increasing efficiency during affine merge mode for versatile video coding by utilizing motion vectors stored in a motion data line buffer for a prediction unit of a second coding tree unit neighboring a first coding tree unit to derive control point motion vectors for the first coding tree unit.

18 Claims, 21 Drawing Sheets

(56) References Cited

U.S. PATENT DOCUMENTS

| | | |
|---|---|---|
| 2013/0336405 A1 | 12/2013 | Chen et al. |
| 2014/0092970 A1* | 4/2014 | Misra ...................... H04N 19/52 |
| | | 375/240.16 |
| 2014/0219357 A1* | 8/2014 | Chuang ................ H04N 19/593 |
| | | 375/240.16 |
| 2014/0233651 A1* | 8/2014 | Nakamura ............. H04N 19/52 |
| | | 375/240.16 |
| 2014/0253681 A1* | 9/2014 | Zhang .................. H04N 19/105 |
| | | 348/43 |
| 2014/0269916 A1* | 9/2014 | Lim ....................... H04N 19/52 |
| | | 375/240.15 |
| 2014/0301463 A1* | 10/2014 | Rusanovskyy ........ H04N 19/52 |
| | | 375/240.16 |
| 2014/0314147 A1* | 10/2014 | Rusanovskyy ...... H04N 19/503 |
| | | 375/240.12 |
| 2015/0172705 A1 | 6/2015 | Lee et al. |
| 2015/0195562 A1* | 7/2015 | Li ........................ H04N 19/176 |
| | | 375/240.16 |
| 2018/0192069 A1* | 7/2018 | Chen ...................... H04N 19/52 |
| 2019/0116376 A1 | 4/2019 | Chen et al. |
| 2019/0191171 A1* | 6/2019 | Ikai ...................... H04N 19/117 |
| 2019/0394483 A1 | 12/2019 | Zhou |
| 2020/0007877 A1 | 1/2020 | Zhou |
| 2020/0029089 A1 | 1/2020 | Xu et al. |

* cited by examiner

LOW COMPLEXITY AFFINE MERGE MODE FOR VERSATILE VIDEO CODING

RELATED APPLICATIONS

The present application claims the benefit of and priority as a continuation to U.S. Nonprovisional application Ser. No. 16/453,672, entitled "Low Complexity Affine Merge Mode for Versatile Video Coding," filed Jun. 26, 2019; which claims priority to U.S. Provisional Application No. 62/690,583, entitled "Low Complexity Affine Merge Mode for Versatile Video Coding," filed Jun. 27, 2018; and U.S. Provisional Application No. 62/694,643, entitled "Low Complexity Affine Merge Mode for Versatile Video Coding," filed Jul. 6, 2018; and U.S. Provisional Application No. 62/724,464, entitled "Low Complexity Affine Merge Mode for Versatile Video Coding," filed Aug. 29, 2018, the entirety of each of which is incorporated by reference herein.

FIELD OF THE DISCLOSURE

This disclosure generally relates to systems and methods for video encoding and compression. In particular, this disclosure relates to systems and methods for low complexity affine merge mode for versatile video coding.

BACKGROUND OF THE DISCLOSURE

Video coding or compression standards allow for digital transmission of video over a network, reducing the bandwidth required to transmit high resolution frames of video to a fraction of its original size. These standards may be lossy or lossless, and incorporate inter- and intra-frame compression, with constant or variable bit rates.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following video compression standard(s), including any draft versions of such standard(s), are hereby incorporated herein by reference in their entirety and are made part of the present disclosure for all purposes: MPEG VVC; ITU-T H.266. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for versatile video coding; and Section B describes a network environment and computing environment which may be useful for practicing embodiments described herein.

A. Low Complexity Affine Merge Mode for Versatile Video Coding

Figure 1A:
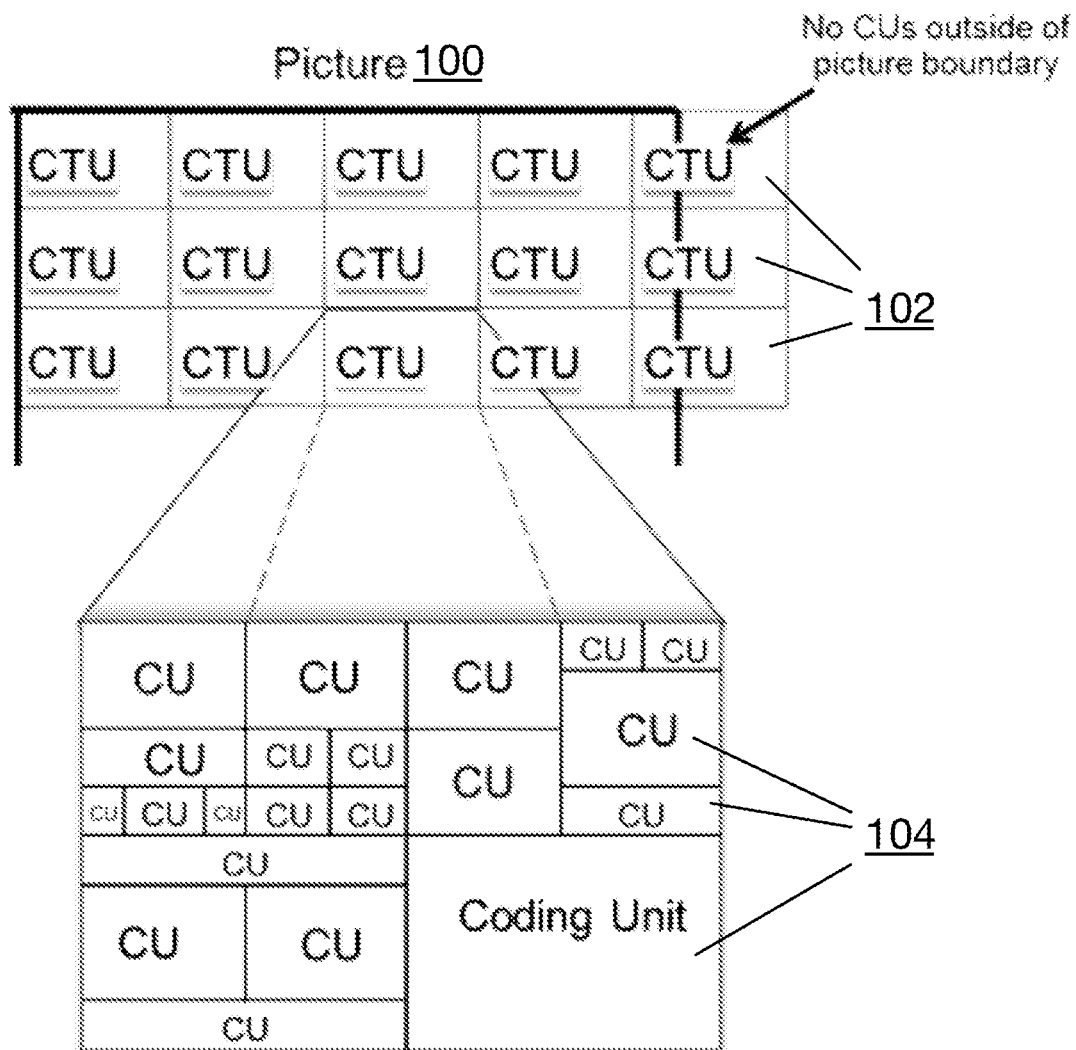
FIG. 1A is an illustration of an example of dividing a picture into coding tree units and coding units, according to some implementations.
Figure 1B:
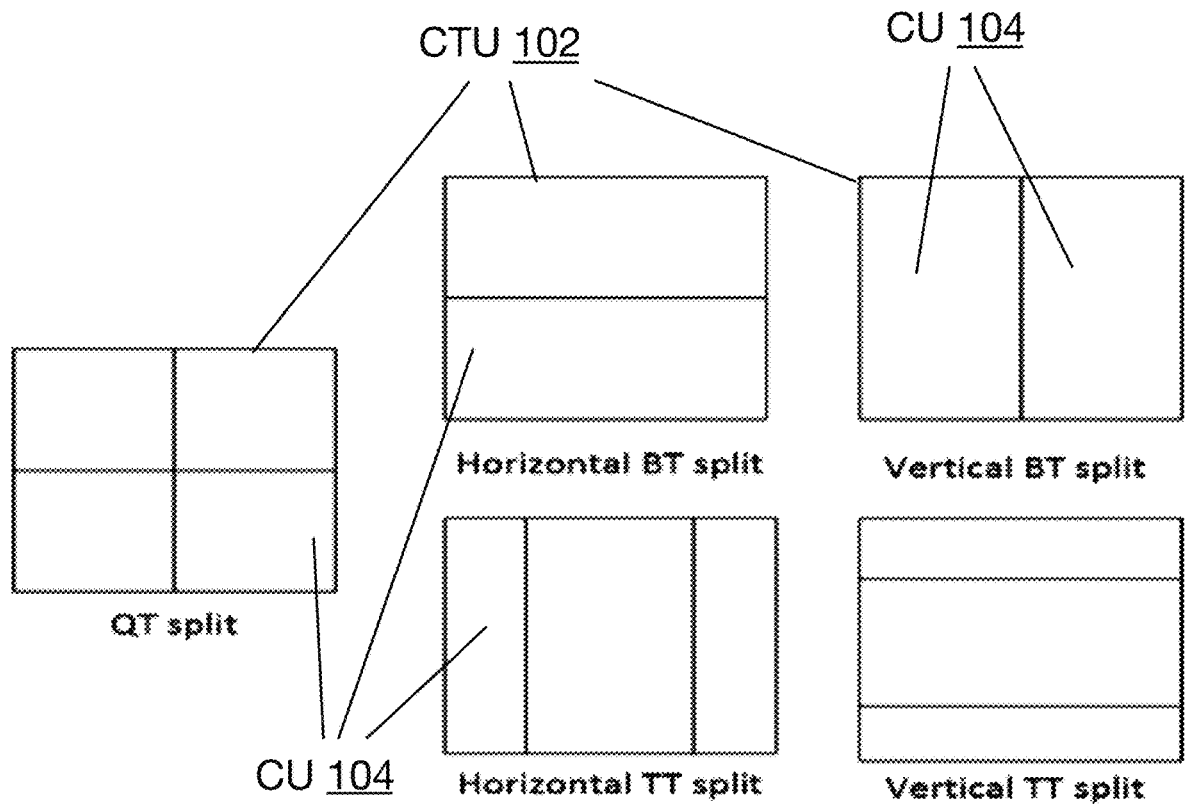
FIG. 1B is an illustration of different splits of coding tree units, according to some implementations.

VVC (Versatile Video Coding) video compression employs a flexible block coding structure to achieve higher compression efficiency. As shown in FIG. 1A, in VVC a picture 100 is divided into coding tree units (CTUs) 102. In some implementations, a CTU can be up to 128×128 pixels in size. A CTU 102 is made up of one or more coding units (CUs) 104 which may be of the same or different sizes, as shown. In some implementations, CUs may be generated by using recursive splits of larger CUs or CTUs. As shown in FIG. 1B, in some implementations, a quad-tree plus binary and triple tree (QTBTT) recursive block partitioning structure is used to divide a CTU 102 into CUs 104. In some implementations, a CU 104 can have four-way split by using quad-tree partitioning (e.g. QT split at left); two-way split by using horizontal or vertical binary tree partitioning (e.g. horizontal BT split and vertical BT split, at top center and top right); or a three-way split by using horizontal or vertical triple tree partitioning (e.g. horizontal TT split and vertical TT split, at bottom center and bottom right). A CU 104 can be as large as a CTU 102 (e.g. having no splits), and as small as a 4×4 pixel block.

In many implementations of VVC, there is no concept of splitting a CU 104 into prediction units (PUs) and Transform Units (TUs) at the CU level, as in some implementations of high efficiency video coding (HEVC). In some implementations, a CU 104 is also a PU and a TU, except for implementations in which the CU size may be larger than the maximum TU size allowed (e.g. the CU size is 128×128 pixels, but the maximum TU size is 64×64 pixels), in which case a CU 104 is forced to split into multiple PUs and/or TUs. Additionally, there are occasions where the TU size is smaller than the CU size, namely in Intra Sub-Partitioning (ISP) and Sub-Block Transforms (SBT). Intra sub-partitioning (ISP) splits an intra-CU, either vertically or horizontally, into 2 or 4 TUs (for luma only, chroma CU is not split). Similarly, sub-block transforms (SBT) split an inter-CU into either 2 or 4 TUs, and only one of these TUs is allowed to have non-zero coefficients. Within a CTU 102, some CUs 104 can be intra-coded, while others can be inter-coded. Such a block structure offers coding flexibility of using different CU/PU/TU sizes based on characteristics of incoming content, especially the ability of using large block size tools (e.g., large prediction unit size up to 128×128 pixels, large transform and quantization size up to 64×64 pixels), providing significant coding gains when compared to MPEG/ITU-T HEVC/H.265 coding.

Figure 2:
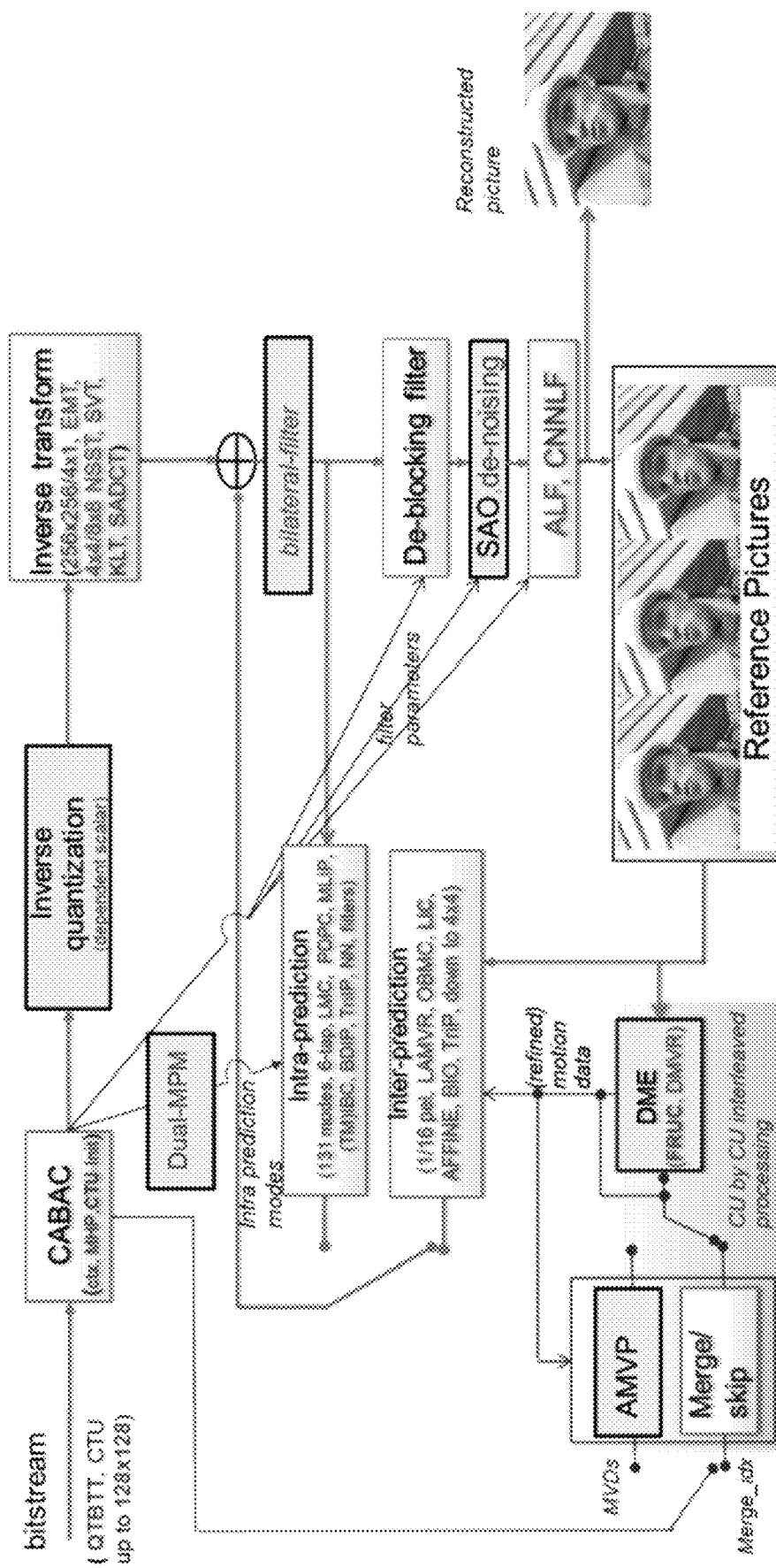
FIG. 2 is a block diagram of a versatile video coding (VVC) decoder, according to some implementations.

FIG. 2 is a block diagram of a versatile video coding (VVC) decoder, according to some implementations. Additional steps may be included in some implementations, as described in more detail herein, including an inverse quantization step after the context-adaptive binary arithmetic coding (CABAC) decoder; an inter- or intra-prediction step (based on intra/inter modes signaled in the bitstream); an inverse quantization/transform step; a sample adaptive offset (SAO) filter step after the de-blocking filter; an advanced motion vector predictor (AMVP) candidate list derivation step for reconstructing motion data of the AMVP mode by adding the predictors to the MVDs (Motion Vector Differences) provided by the CABAC decoder; a merge/skip candidate list derivation step for reconstructing motion data of the merge/skip mode by selecting motion vectors from the list based on the merge index provided by the CABAC decoder; and a decoder motion data enhancement (DME) step providing refined motion data for inter-frame prediction.

In many implementations, VVC employs block-based intra/inter prediction, transform and quantization and entropy coding to achieve its compression goals. Still referring to FIG. 2 and in more detail, the VVC decoder employs CABAC for entropy coding. The CABAC engine decodes the incoming bitstream and delivers the decoded symbols including quantized transform coefficients and control information such as intra prediction modes, inter prediction modes, motion vector differences (MVDs), merge indices (merge_idx), quantization scales and in-loop filter parameters. The quantized transform coefficients may be processed via inverse quantization and an inverse transform to reconstruct the prediction residual blocks for a CU 104. Based on signaled intra- or inter-frame prediction modes, a decoder performs either intra-frame prediction or inter-frame prediction (including motion compensation) to produce the prediction blocks for the CU 104; the prediction residual blocks are added back to the prediction blocks to generate the reconstructed blocks for the CU 104. In-loop filtering, such as a bilateral filter, de-blocking filter, SAO filter, de-noising filter, adaptive loop filter (ALF) and Neural Network based in-loop filters, may be performed on the reconstructed blocks to generate the reconstructed CU 104 (e.g. after in-loop filtering) which is stored in the decoded picture buffer (DPB). In some implementations, one or more of the bilateral filter, de-noising filter, and/or Neural Network based in-loop filters may be omitted or removed. For hardware and embedded software decoder implementations, the DPB may be allocated on off-chip memory due to the reference picture data size.

For an inter-coded CU 104 (a CU 104 using inter-prediction modes), in some implementations, two modes may be used to signal motion data in the bitstream. If the motion data (motion vectors, prediction direction (list 0 and/or list 1), reference index (indices)) of an inter-coded PU is inherited from spatial or temporal neighbors of the current PU, either in merge mode or in skip mode, only the merge index (merge_idx) may be signaled for the PU; the actual motion data used for motion compensation can be derived by constructing a merging candidate list and then addressing it by using the merge_idx. If an inter-coded CU 104 is not using merge/skip mode, the associated motion data may be reconstructed on the decoder side by adding the decoded motion vector differences to the AMVPs (advanced motion vector predictors). Both the merging candidate list and AMVPs of a PU can be derived by using spatial and temporal motion data neighbors.

Figure 3:
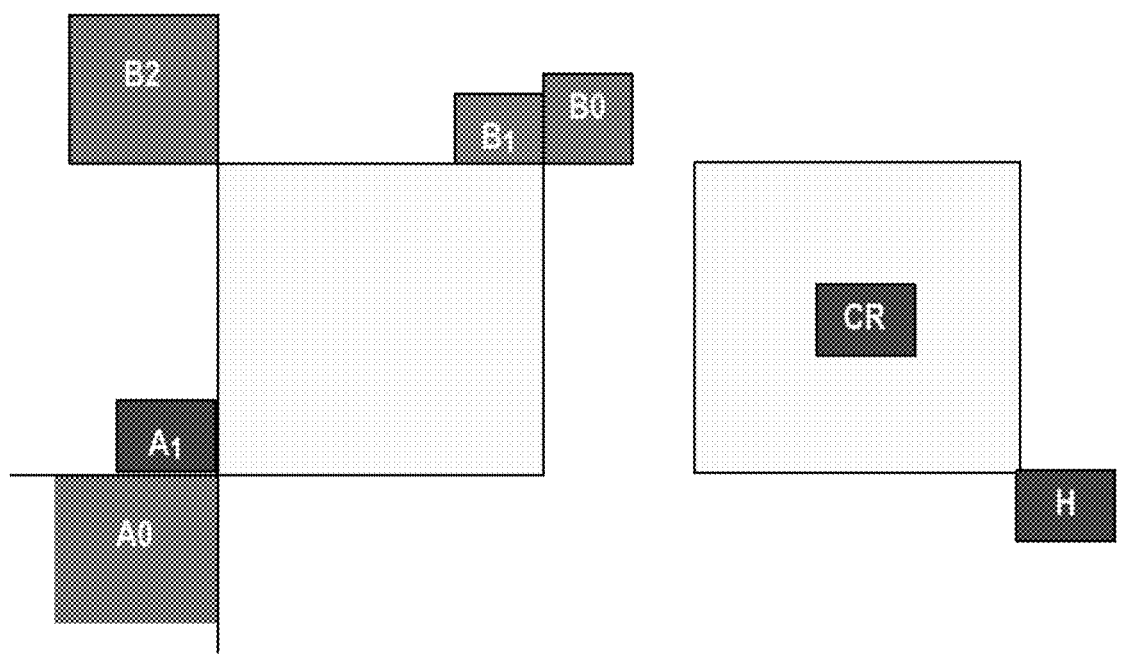
FIG. 3 is an illustration of motion data candidate positions for merging candidate list derivations, according to some implementations.

In many implementations, merge/skip mode allows an inter-predicted PU to inherit the same motion vector(s), prediction direction, and reference picture(s) from an inter-predicted PU which contains a motion data position selected from a group of spatially neighboring motion data positions and one of two temporally co-located motion data positions. FIG. 3 is an illustration of candidate motion data positions for a merge/skip mode, according to some implementations. For the current PU, a merging candidate list may be formed by considering merging candidates from one or more of the seven motion data positions depicted: five spatially neighboring motion data positions (e.g. a bottom left neighboring motion data position A1, an upper neighboring motion data position B1, an upper right neighboring motion data position B0, and a down left neighboring motion data position A0, an top-left neighboring motion data position B2, a motion data position H bottom-right to the temporally co-located PU, and a motion data position CR inside the temporally co-located PU). To derive motion data from a motion data position, the motion data is copied from the corresponding PU which contains (or covers) the motion data position.

The spatial merging candidates, if available, may be ordered in the order of A1, B1, B0, A0 and B2 in the merging candidate list. For example, the merging candidate at position B2 may be discarded if the merging candidates at positions A1, B1, B0 and A0 are all available. A spatial motion data position is treated as unavailable for the merging candidate list derivation if the corresponding PU containing the motion data position is intra-coded, belongs to a different slice from the current PU, or is outside the picture boundaries.

To choose the co-located temporal merging candidate (TMVP), the co-located temporal motion data from the bottom-right motion data position (e.g., (H) in FIG. 3, outside the co-located PU) is first checked and selected for the temporal merging candidate if available. Otherwise, the co-located temporal motion data at the central motion data position (e.g., (CR) in FIG. 3) is checked and selected for the temporal merging candidate if available. The temporal merging candidate is placed in the merging candidate list after the spatial merging candidates. A temporal motion data position (TMDP) is treated as unavailable if the corresponding PU containing the temporal motion data position in the co-located reference picture is intra-coded or outside the picture boundaries.

After adding available spatial and temporal neighboring motion data to the merging list, the list can be appended with the historical merging candidates, average and/or zero candidates until the merging candidate list size reaches a pre-defined or dynamically set maximum size (e.g. 6 candidates, in some implementations).

Due to referencing to motion data from the top spatial neighboring PUs (e.g. B0-B2) in the merge/skip and AMVP candidate list derivation, and CTUs are processed in raster scan order, a motion data line buffer is needed to store spatial neighboring motion data for those neighboring PUs located at the top CTU boundary.

Figure 4A:
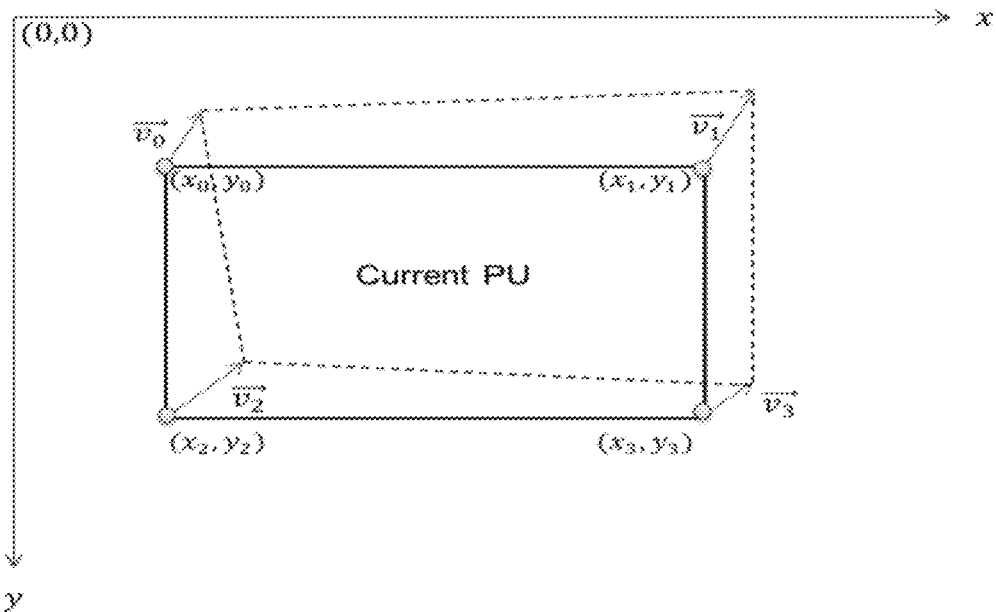
FIG. 4A is an illustration of an affine motion model, according to some implementations.

Affine motion compensation prediction introduces a more complex motion model for better compression efficiency. In some coding implementations, only a translational motion model is considered in which all the sample positions inside a PU may have a same translational motion vector for motion compensated prediction. However, in the real world, there are many kinds of motion, e.g. zoom in/out, rotation, perspective motions and other irregular motions. The affine motion model described herein supports different motion vectors at different sample positions inside a PU, which effectively captures more complex motion. As shown in FIG. 4A, illustrating an implementation of an affine motion model, different sample positions inside a PU, such as four corner points of the PU, may have different motion vectors ($\vec{v}_0$ through $\vec{v}_3$) as supported by the affine mode. In FIG. 4A, the origin (0,0) of the x-y coordinate system is at the top-left corner point of a picture.

A PU coded in affine mode and affine merge mode may have uni-prediction (list 0 or list 1 prediction) or bi-directional prediction (i.e. list 0 and list 1 bi-prediction). If a PU is coded in bi-directional affine or bi-directional affine merge mode, the process of affine mode and affine merge mode described hereafter is performed separately for list 0 and list 1 predictions.

In the affine motion model, the motion vector $\vec{v}=(v_x,v_y)$ at a sample position (x,y) inside a PU is defined as follows:

$$\begin{cases} v_x = ax + cy + e \\ v_y = bx + dy + f \end{cases} \quad \text{Equation 1}$$

where a, b, c, d, e, f are the affine motion model parameters, which define a 6-parameter affine motion model.

A restricted affine motion model, e.g., a 4-parameter model, can be described with the four parameters by restricting a=d and b=−c in Equation 1:

$$\begin{cases} v_x = ax - by + e \\ v_y = bx + ay + f \end{cases} \quad \text{Equation 2}$$

Figure 4B:
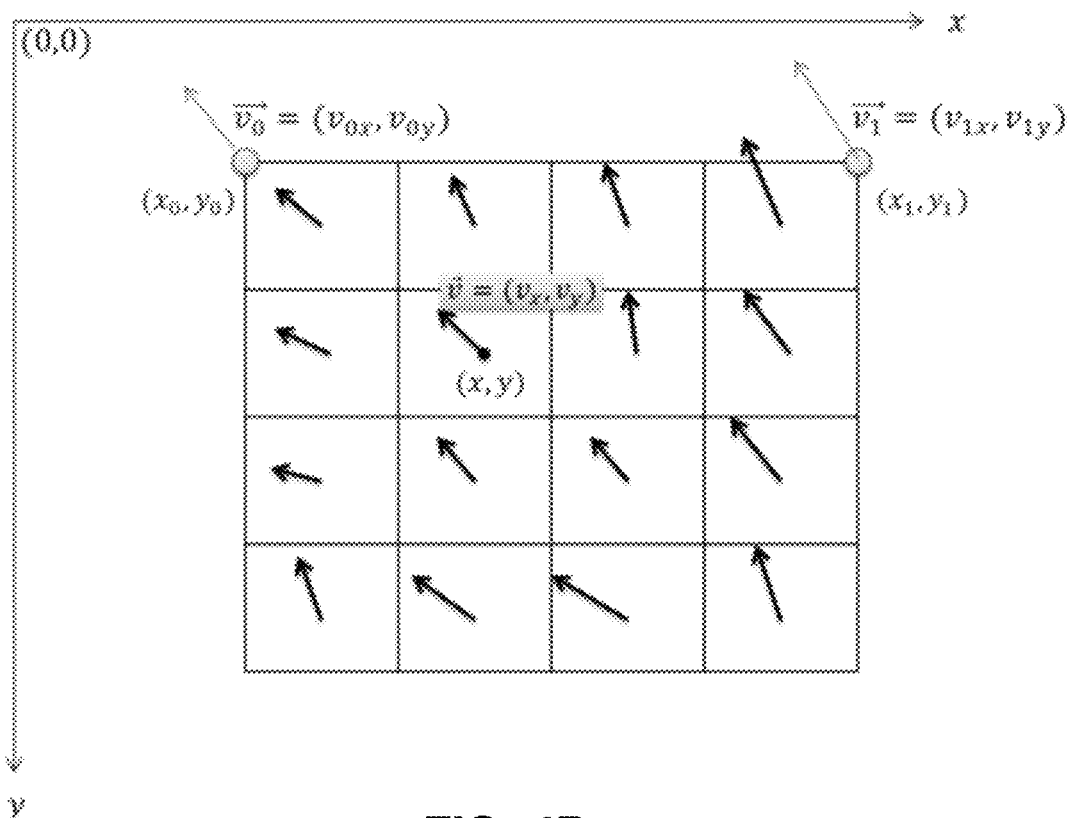
FIG. 4B is an illustration of a restricted affine motion model, according to some implementations.

In the 4-parameter affine motion model proposed to the VVC, the model parameters a, b, e, f are determined by signaling two control point (seed) vectors at the top-left and top-right corner of a PU. As shown in FIG. 4B, with two control point vectors $\vec{v}_0=(v_{0x}, v_{0y})$ at sample position $(x_0, y_0)$ and $\vec{v}_1=(v_{1x},v_{1y})$ at sample position $(x_1,y_1)$, Equation 2 can be rewritten as:

$$\begin{cases} v_x = \frac{(v_{1x} - v_{0x})}{(x_1 - x_0)}(x - x_0) - \frac{(v_{1y} - v_{0y})}{(x_1 - x_0)}(y - y_0) + v_{0x} \\ v_y = \frac{(v_{1y} - v_{0y})}{(x_1 - x_0)}(x - x_0) + \frac{(v_{1x} - v_{0x})}{(x_1 - x_0)}(y - y_0) + v_{0y} \end{cases} \quad \text{Equation 3}$$

One such implementation is illustrated in FIG. 4B, in which $(x_1-x_0)$ equals the PU width and $y_1=y_0$. In fact, to derive the parameters of the 4-parameter affine motion model, the two control point vectors do not have to be at the top-left and top-right corner of a PU as proposed in some methods. As long as the two control points have $x_1 \neq x_0$ and $y_1=y_0$, Equation 3 is valid.

Figure 4C:
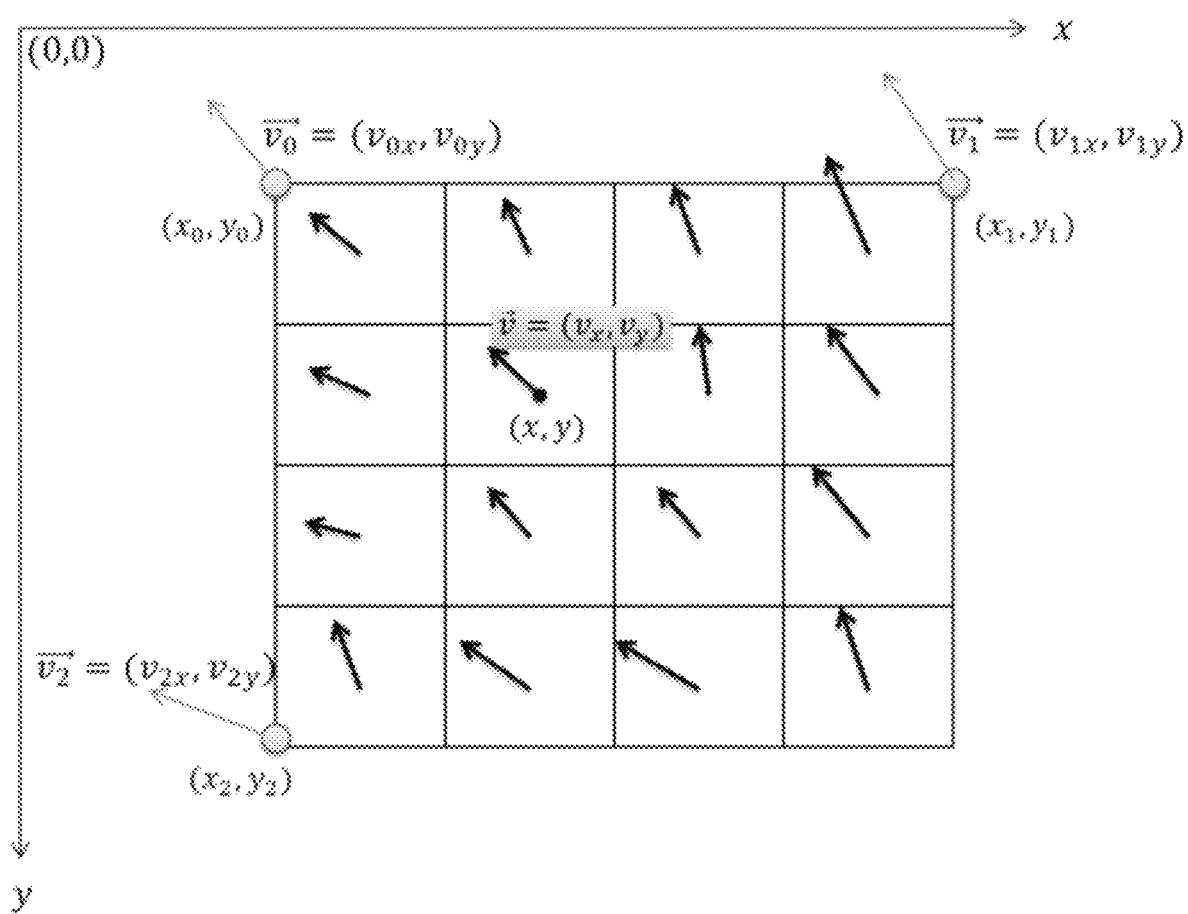
FIG. 4C is an illustration of an expanded affine motion model, according to some implementations.

Likewise, for the 6-parameter affine motion model for some implementations of VVC, the model parameters a, b, c, d, e, f are determined by signaling three control point vectors at the top-left, top-right and bottom-left corner of a PU. As shown in FIG. 4C, with three control point vectors $\vec{v}_0=(v_{0x},v_{0y})$ at sample position $(x_0,y_0)$, $\vec{v}_1=(v_{1x},v_{1y})$ at sample position $(x_1,y_1)$ and $\vec{v}_2=(v_{2x},v_{2y})$ at sample position $(x_2,y_2)$, Equation 1 can be rewritten as:

$$\begin{cases} v_x = \frac{(v_{1x} - v_{0x})}{(x_1 - x_0)}(x - x_0) + \frac{(v_{2x} - v_{0x})}{(y_2 - y_0)}(y - y_0) + v_{0x} \\ v_y = \frac{(v_{1y} - v_{0y})}{(x_1 - x_0)}(x - x_0) + \frac{(v_{2y} - v_{0y})}{(y_2 - y_0)}(y - y_0) + v_{0y} \end{cases} \quad \text{Equation 4}$$

Note that in FIG. 4C, $(x_1-x_0)$ equals the PU width, $(y_2-y_0)$ equals the PU height, $y_1=y_0$ and $x_2=x_0$. To derive the parameters of the 6-parameter affine motion model, the three control point vectors do not have to be at the top-left, top-right and bottom-left corner of a PU as shown in FIG. 4C. As long as the three control points stratify $x_1 \neq x_0$, $y_2 \neq y_0$, $y_1=y_0$ and $x_2=x_0$, Equation 4 is valid.

To constrain the memory bandwidth consumption of the affine mode for motion compensation, the motion vectors of a PU coded in affine mode are not derived for each sample in a PU. As shown in FIGS. 4B and 4C, all of the samples inside a sub-block (e.g. 4×4 block size) of the PU share a same motion vector, which is derived at sample position (x,y). The sample position may be chosen for the sub-block and by using Equation 3 or Equation 4 (depending on the type of affine motion model). The sample position (x,y) selected for the sub-block can be any position within the sub-block, such as the top-left corner or the middle point of the sub-block. This process may be referred to as the sub-block motion data derivation process of the affine mode. Note that the same sub-block motion data (i.e. sub-block motion vectors, prediction direction (list0/list1 unidirectional prediction or list0 and list1 bidirectional prediction) and reference indices) may be used by the motion compensation of the current PU coded in affine mode used as spatial neighboring motion data in the merge/skip, (affine) AMVP list derivation of the adjacent PUs, and stored as temporal motion data (TMVPs) for use with future pictures (see FIG. 3).

In the proposed affine mode, the control point vectors are differentially coded by taking difference relative to the control point motion vector predictors (CPMVPs), which are derived by using the neighboring spatial and temporal motion data of the PU.

Figure 5:
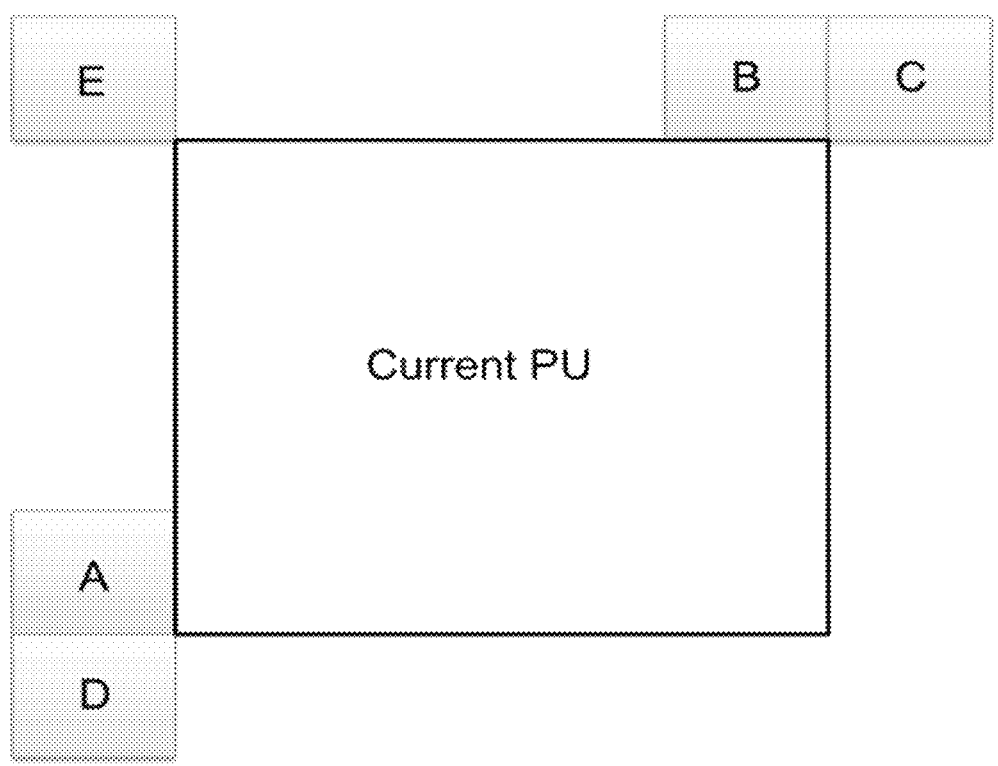
FIG. 5 is an illustration of motion data candidate positions for an affine merge mode, according to some implementations.

To further improve the compression efficiency, an affine merge mode may be utilized in some implementations of VVC. Similar to the regular merge/skip mode described above, a PU can also inherit affine motion data from neighbors in the affine merge mode without explicitly signaling the control point vectors. As shown FIG. 5, in some implementations of an affine merge mode, a PU searches through the five spatial neighbors in the order of A, B, C, D and E (or in other orders, in some implementations), and inherits the affine motion data from the first neighboring block using the affine mode (first referring here to a first selected block rather than block A necessarily), or from the multiple neighboring blocks using the affine mode. A more complex affine merge mode may also use temporal neighbors, as in the regular merge mode.

Figure 6A:
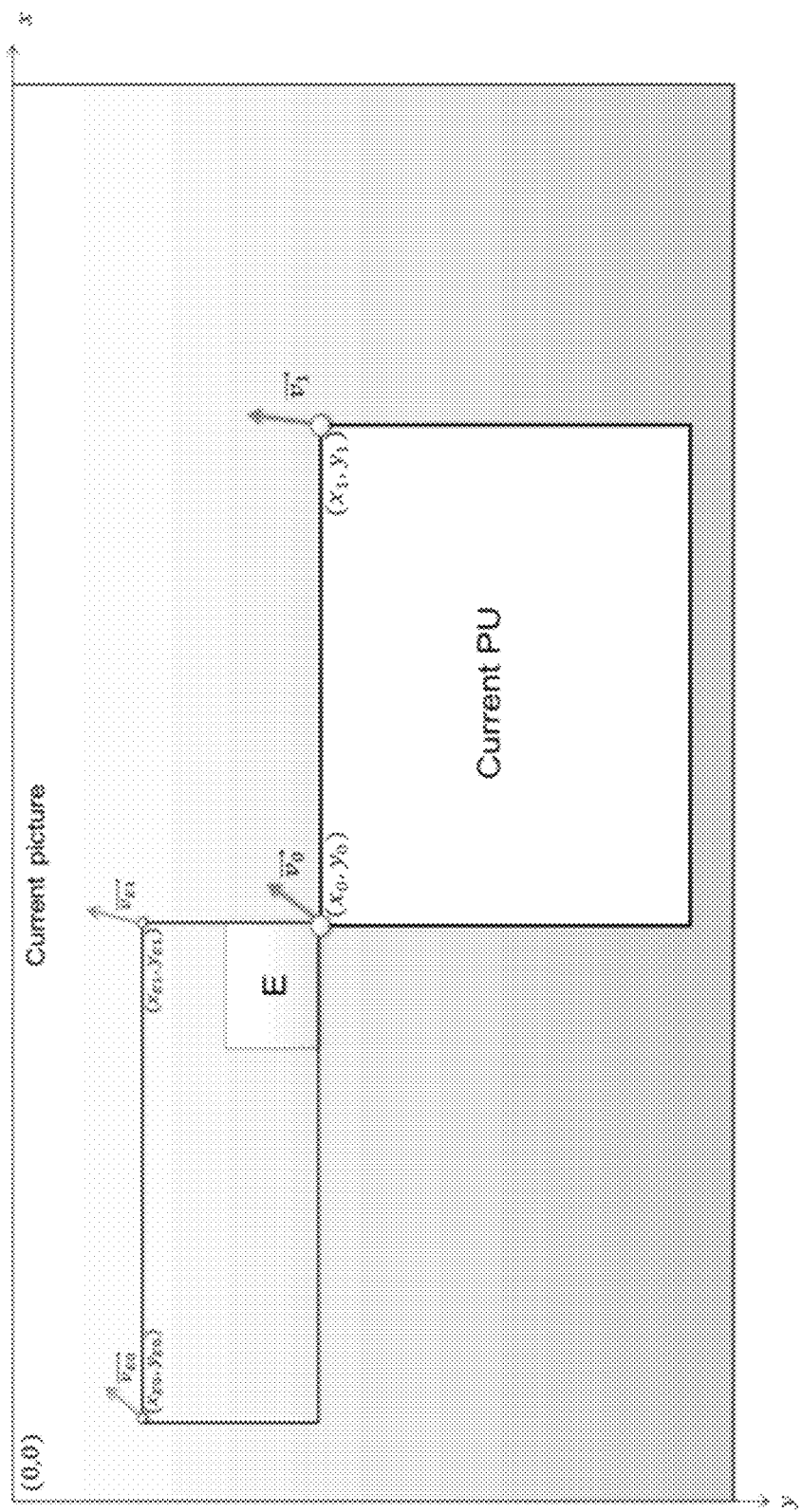
FIG. 6A is an illustration of inheriting affine motion data from neighbors in a 4-parameter affine motion model, according to some implementations.

FIG. 6A illustrates how affine motion data may be inherited from a spatial neighbor in the case of the 4-parameter affine motion model discussed above, according to some implementations. In this example, block E is assumed to be the selected or first neighboring block using the affine mode from which the affine motion data is inherited. The control point vectors for the current PU, i.e. $\vec{v}_0=(v_{0x},v_{0y})$ at the top-left corner position $(x_0,y_0)$ and $\vec{v}_1=(v_{1x},v_{1y})$ at the top-right corner position $(x_1,y_1)$, are derived by using the control point vectors $\vec{v}_{E0}=(v_{E0x},v_{E0y})$ at the top-left sample position $(x_{E0},y_{E0})$, and $\vec{v}_{E1}=(v_{E1x},v_{E1y})$ at the top-right sample position $(x_{E1},y_{E1})$ of the neighboring PU containing block E, and using Equation 3:

$$\begin{cases} v_{0x} = \frac{(v_{E1x}-v_{E0x})}{(x_{E1}-x_{E0})}(x_0-x_{E0}) - \frac{(v_{E1y}-v_{E0y})}{(x_{E1}-x_{E0})}(y_0-y_{E0}) + v_{E0x} \\ v_{0y} = \frac{(v_{E1y}-v_{E0y})}{(x_{E1}-x_{E0})}(x_0-x_{E0}) + \frac{(v_{E1x}-v_{E0x})}{(x_{E1}-x_{E0})}(y_0-y_{E0}) + v_{E0y} \end{cases} \text{Equation 5}$$

$$\begin{cases} v_{1x} = \frac{(v_{E1x}-v_{E0x})}{(x_{E1}-x_{E0})}(x_1-x_{E0}) - \frac{(v_{E1y}-v_{E0y})}{(x_{E1}-x_{E0})}(y_1-y_{E0}) + v_{E0x} \\ v_{1y} = \frac{(v_{E1y}-v_{E0y})}{(x_{E1}-x_{E0})}(x_1-x_{E0}) + \frac{(v_{E1x}-v_{E0x})}{(x_{E1}-x_{E0})}(y_1-y_{E0}) + v_{E0y} \end{cases} \text{Equation 6}$$

As shown in Equations 5 and 6, to derive the control point vectors for the current PU, not only the control point vectors but also the PU size of the neighboring PU coded in the affine mode may be utilized, as $(x_{E1}-x_{E0})$ and $(x_0-x_{E0})$ are the PU width and height of the neighboring PU, respectively.

Figure 6B:
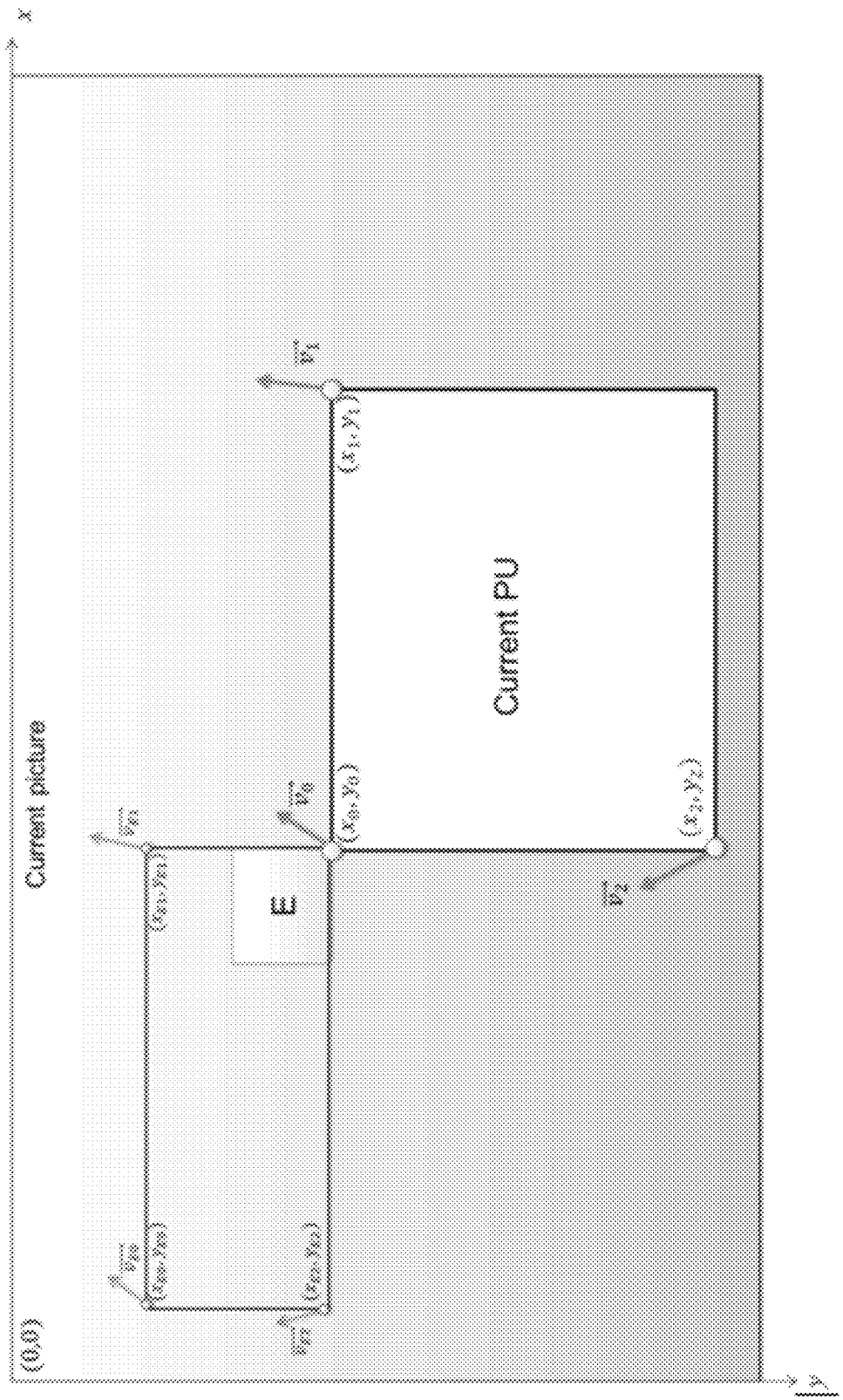
FIG. 6B is an illustration of inheriting affine motion data from neighbors in a 6-parameter affine motion model, according to some implementations.

Similarly, for the example of the 6-parameter affine motion model shown in in FIG. 6B, the control point vectors for the current PU, i.e. $\vec{v}_0=(v_{0x},v_{0y})$ at the top-left corner position $(x_0,y_0)$, $\vec{v}_1=(v_{1x},v_{1y})$ at the top-right corner position $(x_1,y_1)$ and $\vec{v}_2=(v_{2x},v_{2y})$ at the bottom-left corner position $(x_2,y_2)$, are derived by using the control point vectors $\vec{v}_{E0}=(v_{E0x},v_{E0y})$ at the top-left sample position $(x_{E0},y_{E0})$, $\vec{v}_{E1}=(v_{E1x},v_{E1y})$ at the top-right sample position $(x_{E1},y_{E1})$, and $\vec{v}_{E2}=(v_{E2x},v_{E2y})$ at the bottom-left sample position $(x_{E2},y_{E2})$ of the neighboring PU containing block E, and using Equation 4:

$$\begin{cases} v_{0x} = \frac{(v_{E1x}-v_{E0x})}{(x_{E1}-x_{E0})}(x_0-x_{E0}) + \frac{(v_{E2x}-v_{E0x})}{(y_{E2}-y_{E0})}(y_0-y_{E0}) + v_{E0x} \\ v_{0y} = \frac{(v_{E1y}-v_{E0y})}{(x_{E1}-x_{E0})}(x_0-x_{E0}) + \frac{(v_{E2y}-v_{E0y})}{(y_{E2}-y_{E0})}(y_0-y_{E0}) + v_{E0y} \end{cases} \text{Equation 7}$$

$$\begin{cases} v_{1x} = \frac{(v_{E1x}-v_{E0x})}{(x_{E1}-x_{E0})}(x_1-x_{E0}) + \frac{(v_{E2x}-v_{E0x})}{(y_{E2}-y_{E0})}(y_1-y_{E0}) + v_{E0x} \\ v_{1y} = \frac{(v_{E1y}-v_{E0y})}{(x_{E1}-x_{E0})}(x_1-x_{E0}) + \frac{(v_{E2y}-v_{E0y})}{(y_{E2}-y_{E0})}(y_1-y_{E0}) + v_{E0y} \end{cases} \text{Equation 8}$$

$$\begin{cases} v_{2x} = \frac{(v_{E1x}-v_{E0x})}{(x_{E1}-x_{E0})}(x_2-x_{E0}) + \frac{(v_{E2x}-v_{E0x})}{(y_{E2}-y_{E0})}(y_2-y_{E0}) + v_{E0x} \\ v_{2y} = \frac{(v_{E1y}-v_{E0y})}{(x_{E1}-x_{E0})}(x_2-x_{E0}) + \frac{(v_{E2y}-v_{E0y})}{(y_{E2}-y_{E0})}(y_2-y_{E0}) + v_{E0y} \end{cases} \text{Equation 9}$$

In some implementations, the current PU and the neighboring PU may use different types of affine motion models. For example, if the current PU uses the 4-parameter model but a neighboring PU (e.g. E) uses the 6-parameter model, then Equation 7 and Equation 8 can be used for deriving the two control point vectors for the current PU. Similarly, if the current PU uses the 6-parameter model but a neighboring PU (e.g. E) uses the 4-parameter model, then Equation 5, Equation 6 and Equation 10 can be used for deriving the three control point vectors for the current PU.

$$\begin{cases} v_{2x} = \frac{(v_{E1x}-v_{E0x})}{(x_{E1}-x_{E0})}(x_2-x_{E0}) - \frac{(v_{E1y}-v_{E0y})}{(x_{E1}-x_{E0})}(y_2-y_{E0}) + v_{E0x} \\ v_{2y} = \frac{(v_{E1y}-v_{E0y})}{(x_{E1}-x_{E0})}(x_2-x_{E0}) + \frac{(v_{E1x}-v_{E0x})}{(x_{E1}-x_{E0})}(y_2-y_{E0}) + v_{E0y} \end{cases} \text{Equation 10}$$

In some implementations, even if the neighboring PU uses the 4-parameter model, the control point vector $\vec{v}_{E2}=(v_{E2x},v_{E2y})$ at the bottom-left sample position $(x_{E2},y_{E2})$ of the neighboring PU containing block E may be derived using Equation 11 first, then Equation 7, Equation 8 (and Equation 9 if the current PU uses the 6-parameter model). Accordingly, the system may allow derivation of the control point vectors of the current PU, regardless of whether the current PU uses the 4- or 6-parameter model.

$$\begin{cases} v_{E2x} = \frac{(v_{E1x} - v_{E0x})}{(x_{E1} - x_{E0})}(x_{E2} - x_{E0}) - \frac{(v_{E1y} - v_{E0y})}{(x_{E1} - x_{E0})} \\ \qquad (y_{E2} - y_{E0}) + v_{E0x} \\ v_{E2y} = \frac{(v_{E1y} - v_{E0y})}{(x_{E1} - x_{E0})}(x_{E2} - x_{E0}) - \frac{(v_{E1x} - v_{E0x})}{(x_{E1} - x_{E0})} \\ \qquad (y_{E2} - y_{E0}) + v_{E0y} \end{cases} \quad \text{Equation 11}$$

Figure 6C:
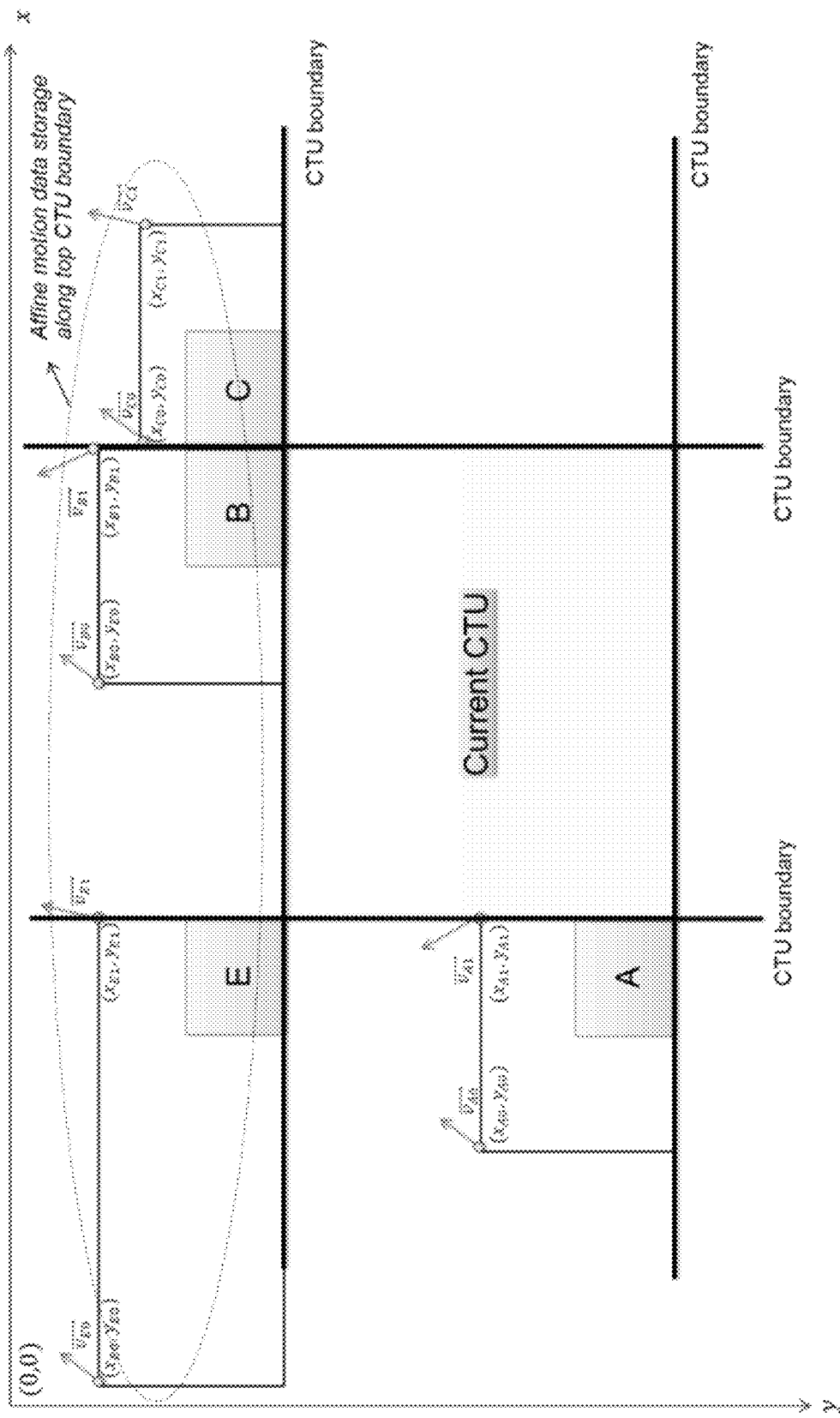
FIG. 6C is an illustration of line buffer storage for affine merge mode in a 4-parameter affine motion model, according to some implementations.

In some implementations, to support the affine merge mode, both PU sizes and control point vectors of neighboring PUs may be stored in a buffer or other memory structure. As a picture is divided into CTUs and coded CTU by CTU in raster scan order, an additional line buffer, i.e. an affine motion data line buffer, may be utilized for storage of the control point vectors and PU sizes of the top neighboring blocks along the CTU boundary. In FIG. 6C, for example, the neighboring PUs of the previous CTU row containing block E, B and C use the affine mode; to support the affine merge mode of the current CTU, the affine motion data information of those neighboring PUs, which include the control point motion vectors, prediction direction (list 0 and/or list 1), reference indices of the control point vectors and the PU sizes (or sample positions of control point vectors), may be stored in the affine motion data line buffer.

Compared to motion data line buffers used for non-affine (regular) merge/skip candidate lists (for merge/skip mode) and AMVP candidate list derivation (for motion vector coding), the size of the affine motion data line buffer is significant. For example, if the minimum PU size is 4×4 and the maximum PU size is 128×128, in a non-affine motion data line buffer, a motion vector (e.g. 4 bytes) and an associated reference picture index (e.g. 4 bits) per prediction list (list 0 and list 1) are stored for every four horizontal samples. However, in some implementations of an affine motion data line buffer, two or three control point vectors (e.g. 8 or 12 bytes depending on the affine motion model used) and an associated reference picture index (e.g. 4 bits) per prediction list (list 0 and list 1), and PU width and height (e.g. 5+5 bits) are stored for every N horizontal samples (e.g. N=8, N is the minimum PU width of PUs allowed for using affine mode). For 4K video with horizontal picture size of 4096 luminance samples, the size of the non-affine motion data line buffer is approximately 9,216 bytes (i.e. 4096*(4+0.5)*2/4); the size of the affine motion data line buffer will be 9,344 bytes (i.e. 4096*(8+0.5)*2/8+4096*10/8/8)) for the 4-parameter affine motion model and 13,440 bytes (i.e. 4096*(12+0.5)*2/8+4096*10/8/8)) for the 6-parameter affine motion model, respectively.

Figure 7A:
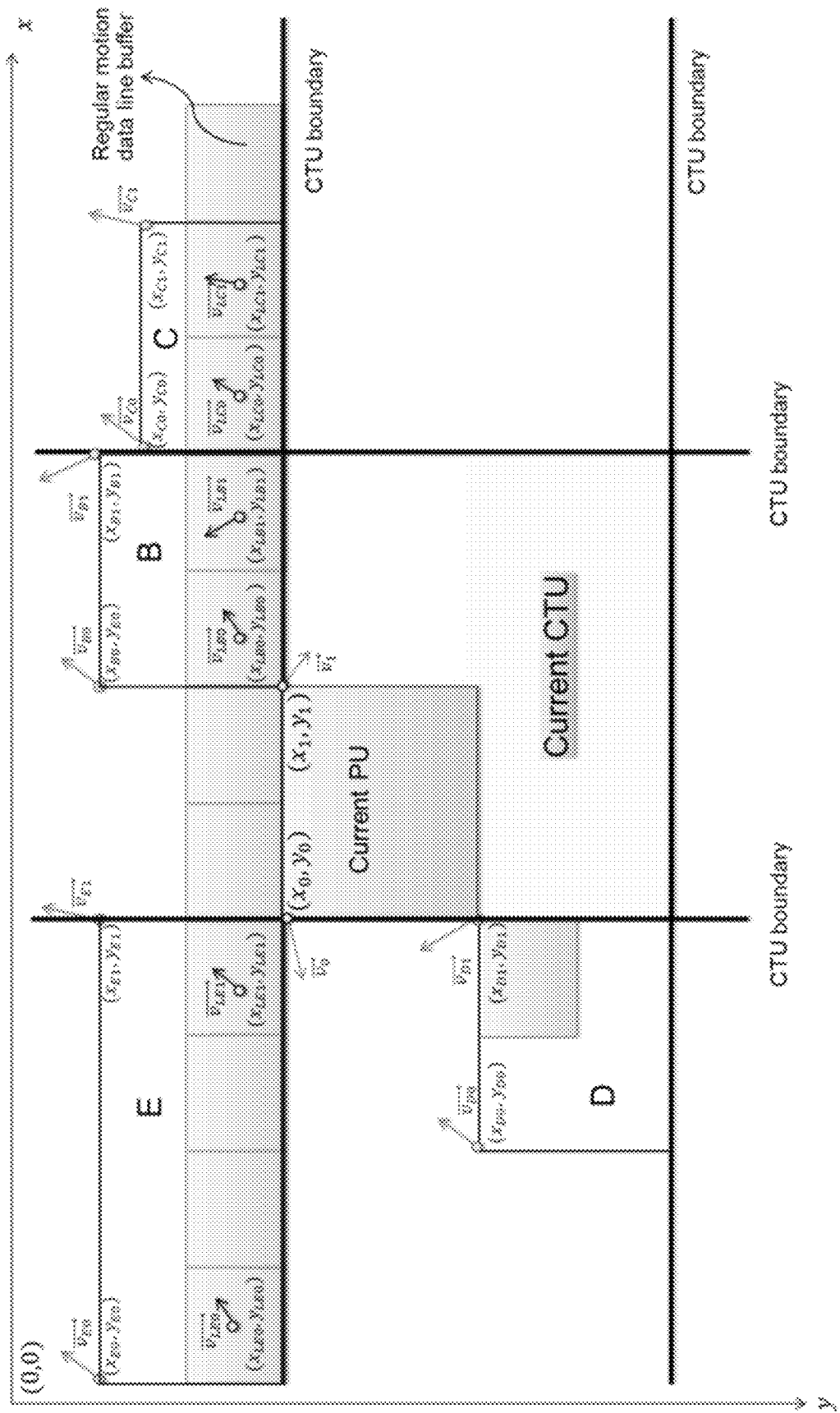
FIG. 7A is an illustration of a shared motion data line buffer for affine merge and non-affine merge/skip mode, for a 4-parameter affine motion model, according to some implementations.

To reduce the memory footprint of the affine motion data line buffer, in some implementations, the non-affine or regular motion data line buffer may be re-used for the affine merge mode. FIG. 7A depicts an implementation of a 4-parameter affine motion model with a re-used motion data line buffer. In some implementations, the positions of control point motion vectors of a PU coded in affine mode or affine merge mode are unchanged, e.g., still at the top-left and top-right corner position of the PU. If a PU is coded in affine mode in which control point motion vectors are explicitly signaled, the control point motion vectors at the top-left and top-right corner position of the PU may be coded into the bitstream. If a PU is coded in affine merge mode in which control point motion vectors are inherited from neighbors, the control point motion vectors at the top-left and top-right corner position of the PU are derived by using control point vectors and positions of the selected neighboring PU.

However, if the selected neighboring PU is located at the top CTU boundary, the motion vectors stored in the regular motion data line buffer rather than the control point motion vectors of the selected PU may be used for derivation of the control point motion vectors of the current PU of the affine merge mode. For example, in FIG. 7A, if the current PU uses the affine merge mode and inherits the affine motion data from the neighboring PU E located at top CTU boundary, then motion vectors in the regular motion data line buffer, e.g., $\vec{v}_{LE0}=(v_{LE0x},v_{LE0y})$ at sample position $(x_{LE0},y_{LE0})$ and $\vec{v}_{LE1}=(v_{LE1x},v_{LE1y})$ at the sample position $(x_{LE1},y_{LE1})$ with $y_{LE1}=y_{LE0}$, instead of affine control point motion vectors of the neighboring PU E, i.e. $\vec{v}_{E0}=(v_{E0x},v_{E0y})$ at the top-left sample position $(x_{E0},y_{E0})$ and $\vec{v}_{E1}=(v_{E1x},v_{E1y})$ at the top-right sample position $(x_{E1},y_{E1})$, are used for the derivation of control point vectors $\vec{v}_0$ and $\vec{v}_1$ of the current PU.

In this case, motion vectors $\vec{v}_{LE0}$ and $\vec{v}_{LE1}$ used for motion compensation of the bottom-left and bottom-right sub-blocks of PU E are calculated by using the 4-parameter affine motion mode, and by:

$$\begin{cases} v_{LE0x} = \frac{(v_{E1x} - v_{E0x})}{(x_{E1} - x_{E0})}(x_{LE0} - x_{E0}) - \frac{(v_{E1y} - v_{E0y})}{(x_{E1} - x_{E0})} \\ \qquad (y_{LE0} - y_{E0}) + v_{E0x} \\ v_{LE0y} = \frac{(V_{E1y} - v_{E0y})}{(x_{E1} - x_{E0})}(x_{LE0} - x_{E0}) + \frac{(v_{E1x} - v_{E0x})}{(x_{E1} - x_{E0})} \\ \qquad (y_{LE0} - y_{E0}) + v_{E0y} \end{cases} \quad \text{Equation 12}$$

$$\begin{cases} v_{LE1x} = \frac{(V_{E1x} - V_{E0x})}{(x_{E1} - x_{E0})}(x_{LE1} - x_{E0}) - \frac{(v_{E1y} - v_{E0y})}{(x_{E1} - x_{E0})} \\ \qquad (y_{LE1} - y_{E0}) + v_{E0x} \\ v_{LE1y} = \frac{(v_{E1y} - v_{E0y})}{(x_{E1} - x_{E0})}(x_{LE1} - x_{E0}) - \frac{(v_{E1x} - v_{E0x})}{(x_{E1} - x_{E0})} \\ \qquad (y_{LE1} - y_{E0}) + v_{E0y} \end{cases} \quad \text{Equation 13}$$

The control point vectors $\vec{v}_0$ and $\vec{v}_1$ of the current PU coded in affine merge mode are derived by $$\begin{cases} v_{0x} = \frac{(v_{LE1x} - v_{LE0x})}{(x_{LE1} - x_{LE0})}(x_0 - x_{LE0}) - \frac{(v_{LE1y} - v_{LE0y})}{(x_{LE1} - x_{LE0})} \\ \qquad (y_0 - y_{LE0}) + v_{LE0x} \\ v_{0y} = \frac{(v_{LE1y} - v_{LE0y})}{(x_{LE1} - x_{LE0})}(x_0 - x_{LE0}) + \frac{(v_{LE1x} - v_{LE0x})}{(x_{LE1} - x_{LE0})} \\ \qquad (y_0 - y_{LE0}) + v_{LE0y} \end{cases} \quad \text{Equation 14}$$

$$\begin{cases} v_{1x} = \frac{(v_{LE1x} - v_{LE0x})}{(x_{LE1} - x_{LE0})}(x_1 - x_{LE0}) - \frac{(v_{LE1y} - v_{LE0y})}{(x_{LE1} - x_{LE0})} \\ \qquad (y_1 - y_{LE0}) + v_{LE0x} \\ v_{1y} = \frac{(v_{LE1y} - v_{LE0y})}{(x_{LE1} - x_{LE0})}(x_1 - x_{LE0}) + \frac{(v_{LE1x} - v_{LE0x})}{(x_{LE1} - x_{LE0})} \\ \qquad (y_1 - y_{LE0}) + v_{LE0y} \end{cases} \quad \text{Equation 15}$$

If the selected neighboring PU is not located at the top CTU boundary, e.g. located to the left side of the current PU or located inside the current CTU, then the control point vectors $\vec{v}_0$ and $\vec{v}_1$ of the current PU are derived by directly using the control point vectors of the selected neighboring PU.

For example, if PU D in FIG. 7A is the selected neighboring PU for the current PU coded in affine merge mode, then the control point vectors $\vec{v}_0$ and $\vec{v}_1$ of the current PU are derived by directly using the neighboring control point vectors of the neighboring PU D, i.e. $\vec{v}_{D0}=(v_{D0x},v_{D0y})$ at the top-left sample position $(x_{D0},y_{D0})$ and $\vec{v}_{D1}=(v_{D1x},v_{D1y})$ at the top-right sample position $(x_{D1},y_{D1})$, and by $$\begin{cases} v_{0x} = \frac{(v_{D1x} - v_{D0x})}{(x_{D1} - x_{LD0})}(x_0 - x_{D0}) - \frac{(v_{D1y} - v_{D0y})}{(x_{D1} - x_{D0})} \\ \quad (y_0 - y_{D0}) + v_{D0x} \\ v_{0y} = \frac{(v_{D1y} - V_{D0y})}{(x_{D1} - x_{D0})}(x_0 - X_{D0}) + \frac{(v_{D1x} - V_{D0x})}{(x_{D1} - x_{D0})} \\ \quad (y_0 - y_{D0}) + v_{D0y} \end{cases}$$ Equation 16

$$\begin{cases} v_{1x} = \frac{(v_{D1x} - v_{D0x})}{(x_{D1} - x_{D0})}(x_1 - x_{D0}) - \frac{(v_{D1y} - v_{D0y})}{(x_{D1} - x_{D0})} \\ \quad (y_1 - y_{D0}) + v_{D0x} \\ v_{1y} = \frac{(v_{D1y} - v_{D0y})}{(x_{D1} - x_{D0})}(x_1 - x_{D0}) + \frac{(v_{D1x} - v_{D0x})}{(x_{D1} - x_{D0})} \\ \quad (y_1 - y_{D0}) + v_{D0y} \end{cases}$$ Equation 17

Implementations of this method effectively reduce the memory footprint of the affine motion data line buffer for the case of 4-parameter affine motion models. In such implementations, the control point motion vectors and associated reference picture indices are replaced by the regular motion data that is already stored in the regular motion data line buffer, and only the PU horizontal size may be additionally stored for the affine merge mode. For 4K video with a picture width of 4096 luminance samples and assuming the minimum PU width using affine mode is 8, the size of the affine motion data line buffer can be reduced from 9,344 bytes (i.e. 4096*(8+0.5)*2/8+4096*10/8/8)) to 320 bytes (i.e. 4096*5/8/8).

Figure 7B:
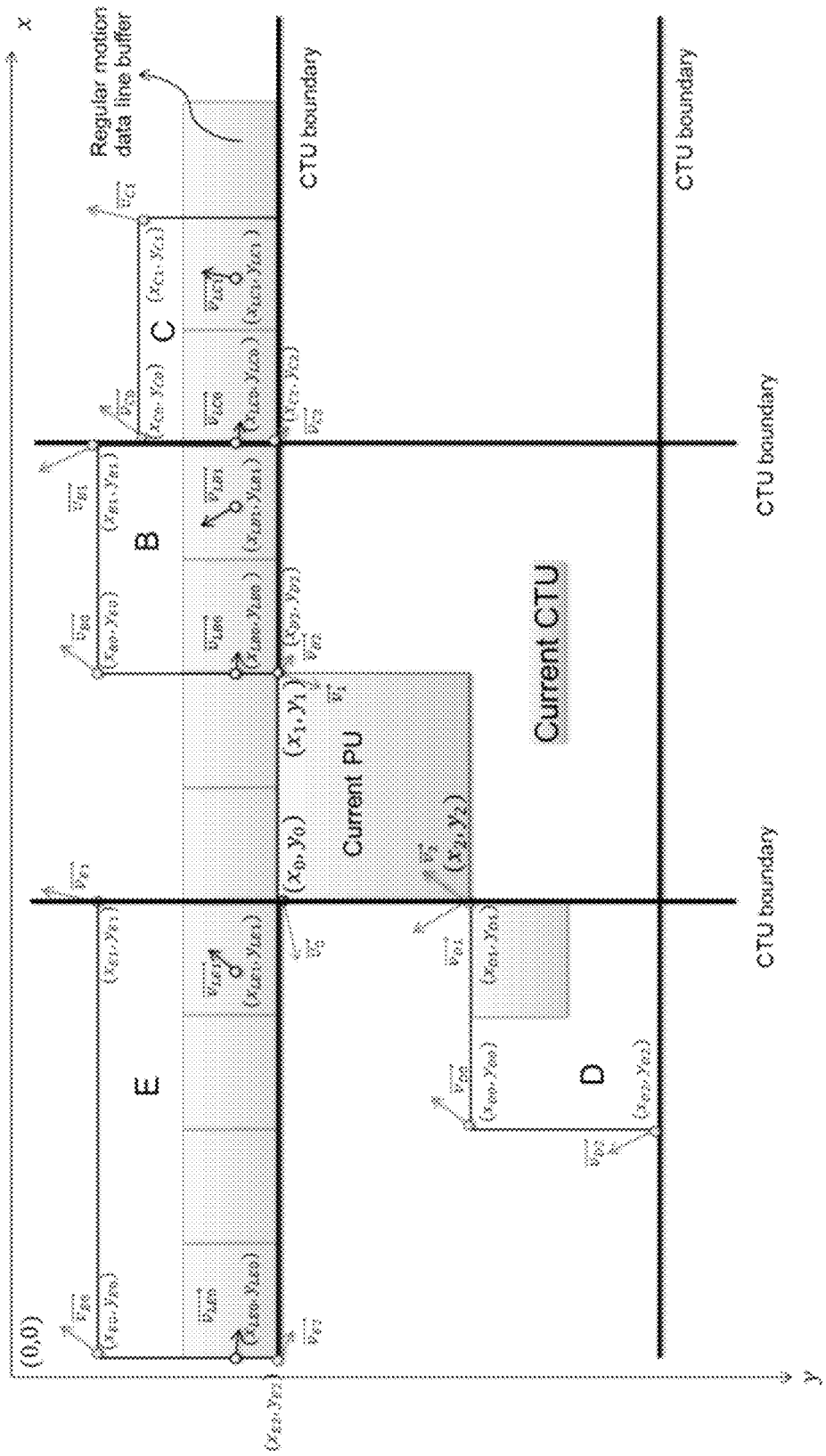
FIG. 7B is an illustration of a shared motion data line buffer for affine merge and non-affine merge/skip mode, for a 6-parameter affine motion model, according to some implementations.

A similar approach can be applied to the 6-parameter affine motion model. As shown in FIG. 7B, if the current PU selects a neighboring PU located at the top CTU boundary, e.g. PU E, as the source PU to inherit the affine motion data, then the derivation of control point vectors $\vec{v}_0$, $\vec{v}_1$ and $\vec{v}_2$ of the current PU can be implemented in two steps. In the first step, the sub-block motion vectors used for motion compensation of the bottom-left and bottom-right sub-block of PU E, i.e. $\vec{v}_{LE0}=(v_{LE0x},v_{LE0y})$ at sample position $(x_{LE0},y_{LE0})$ and $\vec{v}_{LE1}=(v_{LE1x},v_{LE1y})$ at the sample position $(x_{LE1},y_{LE1})$ with $x_{LE0}=x_{E0}$ and $y_{LE1}=y_{LE0}$, are computed by using the 6-parameter affine motion model:

$$\begin{cases} v_{LE0x} = \frac{(v_{E1x} - v_{E0x})}{(x_{E1} - x_{E0})}(x_{LE0} - x_{E0}) + \frac{(v_{E2x} - v_{E0x})}{(y_{E2} - y_{E0})} \\ \quad (y_{LE0} - y_{E0}) + v_{E0x} \\ v_{LE0y} = \frac{(v_{E1y} - v_{E0y})}{(x_{E1} - x_{E0})}(x_{LE0} - x_{E0}) + \frac{(v_{E2y} - v_{E0y})}{(y_{E2} - y_{E0})} \\ \quad (y_{LE0} - y_{E0}) + v_{E0y} \end{cases}$$ Equation 18

$$\begin{cases} v_{LE1x} = \frac{(v_{E1x} - v_{E0x})}{(x_{E1} - x_{E0})}(x_{LE1} - x_{E0}) + \frac{(v_{E2x} - v_{E0x})}{(y_{E2} - y_{E0})} \\ \quad (y_{LE1} - y_{E0}) + v_{E0x} \\ v_{LE1y} = \frac{(v_{E1y} - v_{E0y})}{(x_{E1} - x_{E0})}(x_{LE1} - x_{E0}) + \frac{(v_{E2y} - v_{E0y})}{(y_{E2} - y_{E0})} \\ \quad (y_{LE1} - y_{E0}) + v_{E0y} \end{cases}$$ Equation 19

In the second step, the control point vectors $\vec{v}_0$, $\vec{v}_1$ and $\vec{v}_2$ of the current PU coded in affine merge mode are derived by using the 6-parameter affine motion model, and by $$\begin{cases} v_{0x} = \frac{(v_{LE1x} - v_{LE0x})}{(x_{LE1} - x_{LE0})}(x_0 - x_{LE0}) + \frac{(v_{E0x} - v_{LE0x})}{(y_{E0} - y_{LE0})} \\ \quad (y_0 - y_{LE0}) + v_{LE0x} \\ v_{0y} = \frac{(v_{LE1y} - v_{LE0y})}{(x_{LE1} - x_{LE0})}(x_0 - x_{LE0}) + \frac{(v_{E0y} - v_{LE0y})}{(y_{E0} - y_{LE0})} \\ \quad (y_0 - y_{LE0}) + v_{LE0y} \end{cases}$$ Equation 20

$$\begin{cases} v_{1x} = \frac{(v_{LE1x} - v_{LE0x})}{(x_{LE1} - x_{LE0})}(x_1 - x_{LE0}) + \frac{(v_{E0x} - v_{LE0x})}{(y_{E0} - y_{LE0})} \\ \quad (y_1 - y_{LE0}) + v_{LE0x} \\ v_{1y} = \frac{(v_{LE1y} - v_{LE0y})}{(x_{LE1} - x_{LE0})}(x_1 - x_{LE0}) + \frac{(v_{E0y} - v_{LE0y})}{(y_{E0} - y_{LE0})} \\ \quad (y_1 - y_{LE0}) + v_{LE0y} \end{cases}$$ Equation 21

$$\begin{cases} v_{2x} = \frac{(v_{LE1x} - v_{LE0x})}{(x_{LE1} - x_{LE0})}(x_2 - x_{LE0}) + \frac{(v_{E0x} - v_{LE0x})}{(y_{E0} - y_{LE0})} \\ \quad (y_2 - y_{LE0}) + v_{LE0x} \\ v_{2y} = \frac{(v_{LE1y} - v_{LE0y})}{(x_{LE1} - x_{LE0})}(x_2 - x_{LE0}) + \frac{(v_{E0y} - v_{LE0y})}{(y_{E0} - y_{LE0})} \\ \quad (y_2 - y_{LE0}) + v_{LE0y} \end{cases}$$ Equation 22

There are multiple ways of selecting sample positions for $(x_{LE0},v_{LE0})$ and $(x_{LE1},y_{LE1})$ for the selected neighboring PU (e.g. PU E). In the example depicted in FIG. 7B, $x_{LE0}=x_{E0}$ and $y_{LE1}=y_{LE0}$, satisfying the conditions of the 6-parameter affine model defined by Equation 20, Equation 21, and Equation 22. In another implementation, $x_{LE0}=x_{E2}$, $y_{LE0}=y_{E2}$ and $y_{LE1}=y_{LE0}$, such that the control point vector of the bottom-left corner of PU E is directly used for motion compensation of the sub-block and stored in the regular motion data line buffer.

If the selected neighboring PU is not located at the top CTU boundary, for example, if PU D in FIG. 7B is the selected neighboring PU for the current PU coded in affine merge mode, then the $\vec{v}_0$, $\vec{v}_1$ and $\vec{v}_2$ of the current PU may be derived directly using the neighboring control point vectors, e.g., using $\vec{v}_{D0}=(v_{D0x},v_{D0y})$ at the top-left sample position $(x_{D0},y_{D0})$, $\vec{v}_{D1}=(v_{D1x},v_{D1y})$ at the top-right sample position $(x_{D1},y_{D1})$ and $\vec{v}_{D2}=(v_{D2x},v_{D2y})$ at the bottom-left sample position $(x_{D1},y_{D1})$ of the neighboring PU D, and by $$\begin{cases} v_{0x} = \frac{(v_{D1x} - v_{D0x})}{(x_{D1} - x_{D0})}(x_0 - x_{D0}) + \frac{(v_{D2x} - v_{D0x})}{(y_{D2} - y_{D0})}(y_0 - y_{D0}) + \\ \quad v_{D0x} \\ v_{0y} = \frac{(v_{D1y} - v_{D0y})}{(x_{D1} - x_{D0})}(x_0 - x_{D0}) + \frac{(v_{D2y} - v_{D0y})}{(y_{D2} - y_{D0})}(y_0 - y_{D0}) + \\ \quad v_{D0y} \end{cases}$$ Equation 23

$$\begin{cases} v_{1x} = \frac{(v_{D1x} - v_{D0x})}{(x_{D1} - x_{D0})}(x_1 - x_{D0}) + \frac{(v_{D2x} - v_{D0x})}{(y_{D2} - y_{D0})}(y_1 - y_{D0}) + \\ \qquad v_{D0x} \\ v_{1y} = \frac{(v_{D1y} - v_{D0y})}{(x_{D1} - x_{D0})}(x_1 - x_{D0}) + \frac{(v_{D2y} - v_{D0y})}{(y_{D2} - y_{D0})}(y_1 - y_{D0}) + \\ \qquad v_{D0y} \end{cases} \quad \text{Equation 24}$$

$$\begin{cases} v_{2x} = \frac{(v_{D1x} - v_{D0x})}{(x_{D1} - x_{D0})}(x_2 - x_{D0}) + \frac{(v_{D2x} - v_{D0x})}{(y_{D2} - y_{D0})}(y_2 - y_{D0}) + \\ \qquad v_{D0x} \\ v_{2y} = \frac{(v_{D1y} - v_{D0y})}{(x_{D1} - x_{D0})}(x_2 - x_{D0}) + \frac{(v_{D2y} - v_{D0y})}{(y_{D2} - y_{D0})}(y_2 - y_{D0}) + \\ \qquad v_{D0y} \end{cases} \quad \text{Equation 25}$$

In some implementations using the 6-parameter affine motion model, only two control point vectors can be replaced by the motion data stored in the regular motion data line buffer; the third control point vector required by the 6-parameter model, e.g., either the top-left or top-right control point vector of a PU, may be stored in the affine motion data line buffer. In such implementations, both the PU width and height may also be stored. Nonetheless, this still results in significant memory savings. For 4K video with picture width of 4096 luminance samples and assuming the minimum PU width using affine mode is 8, the size of affine motion data line buffer has been reduced from 13,440 bytes (i.e. 4096*(12+0.5)*2/8+4096*10/8/8)) to 4,736 bytes (i.e. 4096*4*2/8+4096*10/8/8)).

Figure 8A:
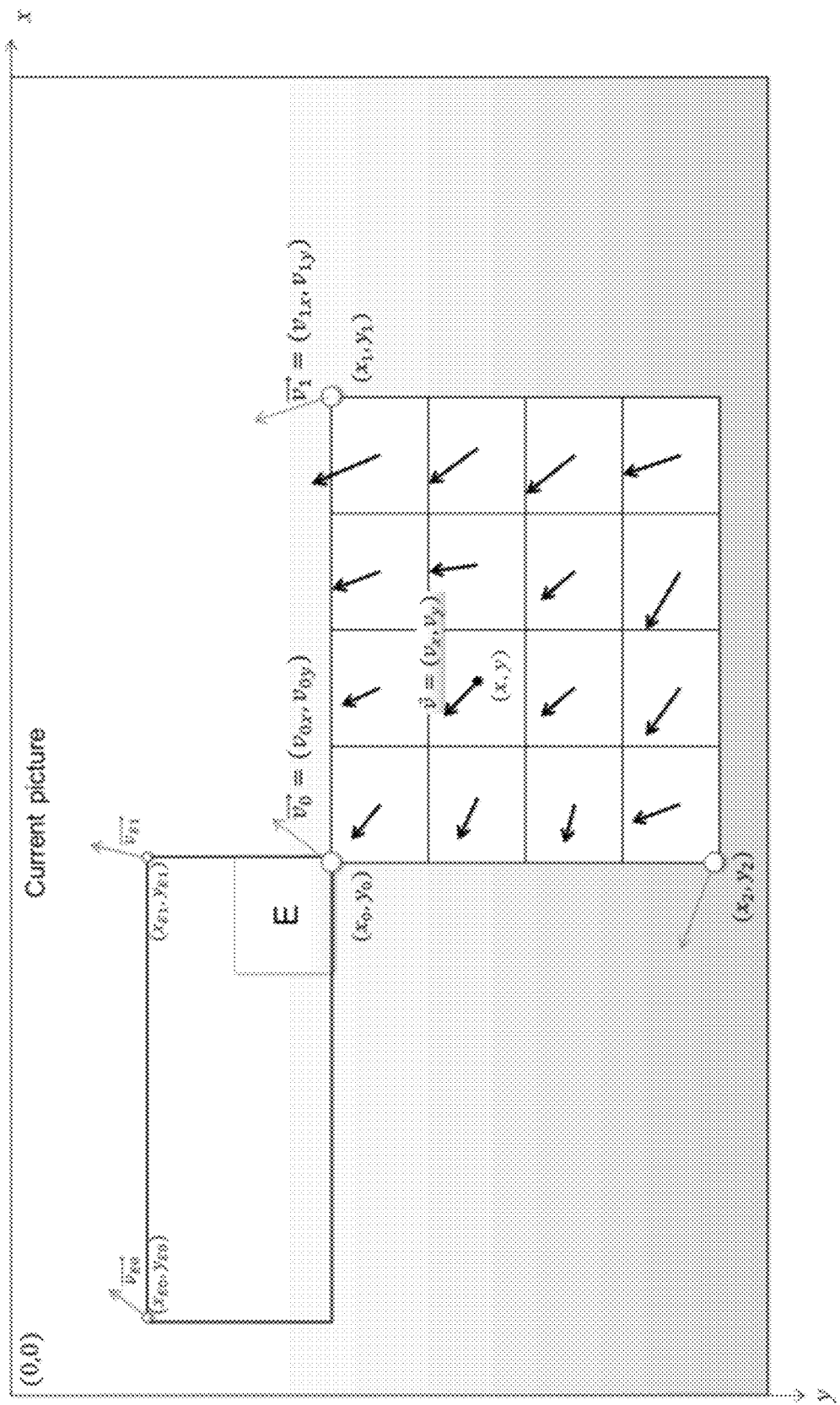
FIG. 8A is an illustration of parallel derivation of control point vectors and sub-block vectors for a current prediction unit, according to some implementations.

Although discussed primarily as serial operations, in some implementations, for the affine merge mode, instead of a sequential process of deriving the control point vectors from the neighboring affine motion data for the current PU, followed by deriving sub-block motion data of the current PU by using the derived control point vectors, a parallel process can be used in which both the derivation of control point vectors and the derivation of sub-block motion data for the current PU directly use the neighboring affine motion data. For example, for a 4-parameter model as shown in FIG. 8A, if the current PU of the affine merge mode inherits affine motion data from a neighboring PU E, the same control point vectors of neighboring PU E (e.g., $\vec{v}_{E0}=(v_{E0x},v_{E0y})$ and $\vec{v}_{E1}=(v_{E1x},v_{E1y})$) may be used for derivation of the control point vectors of the current PU (e.g., $\vec{v}_0=(v_{0x},v_{0y})$ at the top-left corner position $(x_0,y_0)$ and $\vec{v}_1=(v_{1x},v_{1y})$ at the top-right corner position $(x_1,y_1)$, as well as the sub-block motion vector $\vec{v}=(v_x,v_y)$ at a sub-block location (x,y) inside the current PU), and by:

$$\begin{cases} v_{0x} = \frac{(v_{E1x} - v_{E0x})}{(x_{E1} - x_{E0})}(x_0 - x_{E0}) + \frac{(v_{E1y} - v_{E0y})}{(x_{E1} - x_{E0})}(y_0 - y_{E0}) + \\ \qquad v_{E0x} \\ v_{0y} = \frac{(v_{E1y} - v_{E0y})}{(x_{E1} - x_{E0})}(x_0 - x_{E0}) + \frac{(v_{E1x} - v_{E0x})}{(x_{E1} - x_{E0})}(y_0 - y_{E0}) + \\ \qquad v_{E0y} \end{cases} \quad \text{Equation 26}$$

$$\begin{cases} v_{1x} = \frac{(v_{E1x} - v_{E0x})}{(x_{E1} - x_{E0})}(x_1 - x_{E0}) + \frac{(v_{E1y} - v_{E0y})}{(x_{E1} - x_{E0})}(y_1 - y_{E0}) + \\ \qquad v_{E0x} \\ v_{1y} = \frac{(v_{E1y} - v_{E0y})}{(x_{E1} - x_{E0})}(x_1 - x_{E0}) + \frac{(v_{E1x} - v_{E0x})}{(x_{E1} - x_{E0})}(y_1 - y_{E0}) + \\ \qquad v_{E0y} \end{cases} \quad \text{Equation 27}$$

$$\begin{cases} v_x = \frac{(v_{E1x} - v_{E0x})}{(x_{E1} - x_{E0})}(x - x_{E0}) + \frac{(v_{E1y} - v_{E0y})}{(x_{E1} - x_{E0})}(y - y_{E0}) + \\ \qquad v_{E0x} \\ v_y = \frac{(v_{E1y} - v_{E0y})}{(x_{E1} - x_{E0})}(x - x_{E0}) + \frac{(v_{E1x} - v_{E0x})}{(x_{E1} - x_{E0})}(y - y_{E0}) + \\ \qquad v_{E0y} \end{cases} \quad \text{Equation 28}$$

In some implementations, the derivation of control point vectors and the derivation of sub-block vectors are separated into two steps. In the first step, the control point vectors of the current PU, e.g., $\vec{v}_0=(v_{0x},v_{0y})$ at the top-left corner position $(x_0,y_0)$ and $\vec{v}_1=(v_{1x},v_{1y})$ at the top-right corner position $(x_1,y_1)$, are derived by using the following Equations:

$$\begin{cases} v_{0x} = \frac{(v_{E1x} - v_{E0x})}{(x_{E1} - x_{E0})}(x_0 - x_{E0}) - \frac{(v_{E1y} - v_{E0y})}{(x_{E1} - x_{E0})}(y_0 - y_{E0}) + v_{E0x} \\ v_{0y} = \frac{(v_{E1y} - v_{E0y})}{(x_{E1} - x_{E0})}(x_0 - x_{E0}) + \frac{(v_{E1x} - v_{E0x})}{(x_{E1} - x_{E0})}(y_0 - y_{E0}) + v_{E0y} \end{cases} \quad \text{Equation 29}$$

$$\begin{cases} v_{1x} = \frac{(v_{E1x} - v_{E0x})}{(x_{E1} - x_{E0})}(x_1 - x_{E0}) - \frac{(v_{E1y} - v_{E0y})}{(x_{E1} - x_{E0})}(y_1 - y_{E0}) + v_{E0x} \\ v_{1y} = \frac{(v_{E1y} - v_{E0y})}{(x_{E1} - x_{E0})}(x_1 - x_{E0}) + \frac{(v_{E1x} - v_{E0x})}{(x_{E1} - x_{E0})}(y_1 - y_{E0}) + v_{E0y} \end{cases} \quad \text{Equation 30}$$

In the second step, the sub-block motion vector $\vec{v}=(v_x,v_y)$ at a sub-block location (x,y) inside the current PU is computed by the derived control point vectors $\vec{v}_0$ and $\vec{v}_1$, and by $$\begin{cases} v_x = \frac{(v_{1x} - v_{0x})}{(x_1 - x_0)}(x - x_0) - \frac{(v_{1y} - v_{0y})}{(x_1 - x_0)}(y - y_0) + v_{0x} \\ v_y = \frac{(v_{1y} - v_{0y})}{(x_1 - x_0)}(x - x_0) + \frac{(v_{1x} - v_{0x})}{(x_1 - x_0)}(y - y_0) + v_{0y} \end{cases} \quad \text{Equation 31}$$

The similar parallel process of derivation of control point vectors and sub-block motion data for the current PU coded in affine merge mode can also be implemented for other types of affine motion model (e.g. the 6-parameter model).

Although the proposed method is mainly described for the 4-parameter and 6-parameter affine motion models, the same approach can be applied to other affine motion models, such as 3-parameter affine motion models used for zooming or rotation only.

Figure 8B:
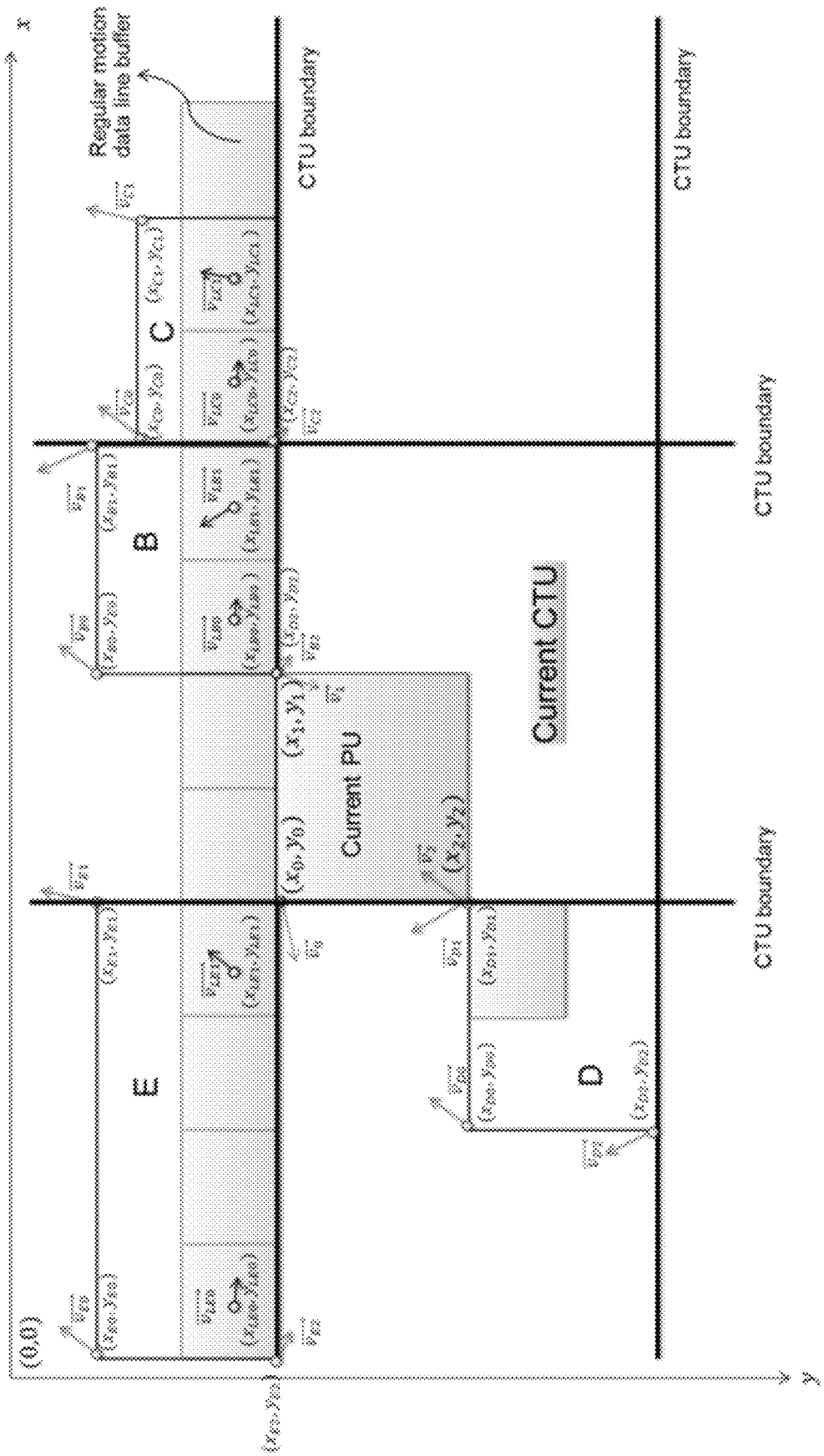
FIG. 8B is an illustration of a shared motion data line buffer for affine merge and non-affine merge/skip mode, for a 6-parameter affine motion model, modified from the implementation of FIG. 7B.

FIG. 8B is an illustration of a shared motion data line buffer for affine merge and non-affine merge/skip mode, for a 6-parameter affine motion model, modified from the implementation of FIG. 7B. As shown, vectors $\vec{v}_{LE0}$, $\vec{v}_{LB0}$, and $\vec{v}_{LC0}$ are shifted relative to their positions in the implementation of FIG. 7B. Specifically, in the case of the 6-parameter affine model, a significant amount of line buffer storage is still utilized because of required storage of either the top-left or top-right control point vector in addition to sharing the motion data line buffer. To further reduce the line buffer footprint in the 6-parameter model case, the following approach can be applied.

As shown in FIG. 8B, if the current PU selects a neighboring PU located at the top CTU boundary, e.g. PU E, as the source PU to inherit the affine motion data, then the derivation of control point vectors $\vec{v}_0$, $\vec{v}_1$ and $\vec{v}_2$ of the current PU can be implemented in two steps.

In the first step, the sub-block motion vectors used for motion compensation of the bottom-left and bottom-right sub-block of PU E, i.e. $\vec{v}_{LE0}=(v_{LE0x},v_{LE0y})$ at sample position $(x_{LE0},y_{LE0})$ and $\vec{v}_{LE1}=(v_{LE1x},v_{LE1y})$ at the sample position $(x_{LE1},y_{LE1})$ with $y_{LE1}=y_{LE0}$, are computed by using the 6-parameter affine motion model:

$$\begin{cases} v_{LE0x} = \frac{(v_{E1x}-v_{E0x})}{(x_{E1}-x_{E0})}(x_{LE0}-x_{E0}) + \frac{(v_{E2x}-v_{E0x})}{(y_{E2}-y_{E0})}(y_{LE0}-y_{E0}) + v_{E0x} \\ v_{LE0y} = \frac{(v_{E1y}-v_{E0y})}{(x_{E1}-x_{E0})}(x_{LE0}-x_{E0}) + \frac{(v_{E2y}-v_{E0y})}{(y_{E2}-y_{E0})}(y_{LE0}-y_{E0}) + v_{E0y} \end{cases}$$ Equation 32

$$\begin{cases} v_{LE1x} = \frac{(v_{E1x}-v_{E0x})}{(x_{E1}-x_{E0})}(x_{LE1}-x_{E0}) + \frac{(v_{E2x}-v_{E0x})}{(y_{E2}-y_{E0})}(y_{LE1}-y_{E0}) + v_{E0x} \\ v_{LE1y} = \frac{(v_{E1y}-v_{E0y})}{(x_{E1}-x_{E0})}(x_{LE1}-x_{E0}) + \frac{(v_{E2y}-v_{E0y})}{(y_{E2}-y_{E0})}(y_{LE1}-y_{E0}) + v_{E0y} \end{cases}$$ Equation 33

In the second step, in some implementations, the control point vectors $\vec{v}_0$, $\vec{v}_1$ and $\vec{v}_2$ of the current PU coded in affine merge mode are derived by using the 4-parameter affine motion model (instead of the 6-parameter model), by:

$$\begin{cases} v_{0x} = \frac{(v_{LE1x}-v_{LE0x})}{(x_{LE1}-x_{LE0})}(x_0-x_{LE0}) - \frac{(v_{LE1y}-v_{LE0y})}{(x_{LE1}-x_{LE0})}(y_0-y_{LE0}) + v_{LE0x} \\ v_{0y} = \frac{(v_{LE1y}-v_{LE0y})}{(x_{LE1}-x_{LE0})}(x_0-x_{LE0}) + \frac{(v_{LE1x}-v_{LE0x})}{(x_{LE1}-x_{LE0})}(y_0-y_{LE0}) + v_{LE0y} \end{cases}$$ Equation 34

$$\begin{cases} v_{1x} = \frac{(v_{LE1x}-v_{LE0x})}{(x_{LE1}-x_{LE0})}(x_1-x_{LE0}) - \frac{(v_{LE1y}-v_{LE0y})}{(x_{LE1}-x_{LE0})}(y_1-y_{LE0}) + v_{LE0x} \\ v_{1y} = \frac{(v_{LE1y}-v_{LE0y})}{(x_{LE1}-x_{LE0})}(x_1-x_{LE0}) + \frac{(v_{LE1x}-v_{LE0x})}{(x_{LE1}-x_{LE0})}(y_1-y_{LE0}) + v_{LE0y} \end{cases}$$ Equation 35

$$\begin{cases} v_{2x} = \frac{(v_{LE1x}-v_{LE0x})}{(x_{LE1}-x_{LE0})}(x_2-x_{LE0}) - \frac{(v_{LE1y}-v_{LE0y})}{(x_{LE1}-x_{LE0})}(y_2-y_{LE0}) + v_{LE0x} \\ v_{2y} = \frac{(v_{LE1y}-v_{LE0y})}{(x_{LE1}-x_{LE0})}(x_2-x_{LE0}) + \frac{(v_{LE1x}-v_{LE0x})}{(x_{LE1}-x_{LE0})}(y_2-y_{LE0}) + v_{LE0y} \end{cases}$$ Equation 36

If the selected neighboring PU is not located at the top CTU boundary—for example, if PU D in FIG. 8B is the selected neighboring PU for the current PU coded in affine merge mode—then the $\vec{v}_0$, $\vec{v}_1$ and $\vec{v}_2$ of the current PU are derived by directly using the neighboring control point vectors, i.e. using $\vec{v}_{D0}=(v_{D0x},v_{D0y})$ at the top-left sample position $(x_{D0},y_{D0})$, $\vec{v}_{D1}=(v_{D1x},v_{D1y})$ at the top-right sample position $(x_{D1},y_{D1})$ and $\vec{v}_{D2}=(v_{D2x},v_{D2y})$ at the bottom-left sample position $(x_{D1},y_{D1})$ of the neighboring PU D, and by:

$$\begin{cases} v_{0x} = \frac{(v_{D1x} - v_{D0x})}{(x_{D1} - x_{D0})}(x_0 - x_{D0}) - \frac{(v_{D1y} - v_{D0y})}{(x_{D1} - x_{D0})}(y_0 - y_{D0}) + v_{D0x} \\ v_{0y} = \frac{(v_{D1y} - v_{D0y})}{(x_{D1} - x_{D0})}(x_0 - x_{D0}) + \frac{(v_{D1x} - v_{D0x})}{(x_{D1} - x_{D0})}(y_0 - y_{D0}) + v_{D0y} \end{cases} \quad \text{Equation 37}$$

$$\begin{cases} v_{1x} = \frac{(v_{D1x} - v_{D0x})}{(x_{D1} - x_{D0})}(x_1 - x_{D0}) - \frac{(v_{D1y} - v_{D0y})}{(x_{D1} - x_{D0})}(y_1 - y_{D0}) + v_{D0x} \\ v_{1y} = \frac{(v_{D1y} - v_{D0y})}{(x_{D1} - x_{D0})}(x_1 - x_{D0}) + \frac{(v_{D1x} - v_{D0x})}{(x_{D1} - x_{D0})}(y_1 - y_{D0}) + v_{D0y} \end{cases} \quad \text{Equation 38}$$

$$\begin{cases} v_{2x} = \frac{(v_{D1x} - v_{D0x})}{(x_{D1} - x_{D0})}(x_2 - x_{D0}) - \frac{(v_{D1y} - v_{D0y})}{(x_{D1} - x_{D0})}(y_2 - y_{D0}) + v_{D0x} \\ v_{2y} = \frac{(v_{D1y} - v_{D0y})}{(x_{D1} - x_{D0})}(x_2 - x_{D0}) + \frac{(v_{D1x} - v_{D0x})}{(x_{D1} - x_{D0})}(y_2 - y_{D0}) + v_{D0y} \end{cases} \quad \text{Equation 39}$$

This simplified method also works for affine merge mode with adaptive selection of affine motion model at the PU level (e.g. adaptive 4-parameter and 6-parameter model at PU level). As long as the 4-parameter model (as used above in Equations 34, 35 and 36) is used to drive the control point vectors for the current PU for the case in which the selected neighboring PU uses the 6-parameter model and at the top CTU boundary, the additional storage of the top-left or top-right control point vectors and PU height of the selected PU can be avoided.

With this simplified method, the line buffer size can be even further reduced. For 4K video with a picture width of 4096 luminance samples and assuming a minimum PU width using affine mode is 8, the size of affine motion data line buffer has been reduced from 13,440 bytes (i.e. 4096*(12+0.5)*2/8+4096*10/8/8)) to 320 bytes (i.e. 4096*5/8/8)).

In implementations using a 6-parameter affine model, if the neighboring PU width is large enough, the 6-parameter affine model may be used for the derivation of control point vectors of the current PU. Depending on the neighboring PU width, an adaptive 4- and 6-parameter affine motion model may be used to derive the control point vectors of the current PU.

Figure 9A:
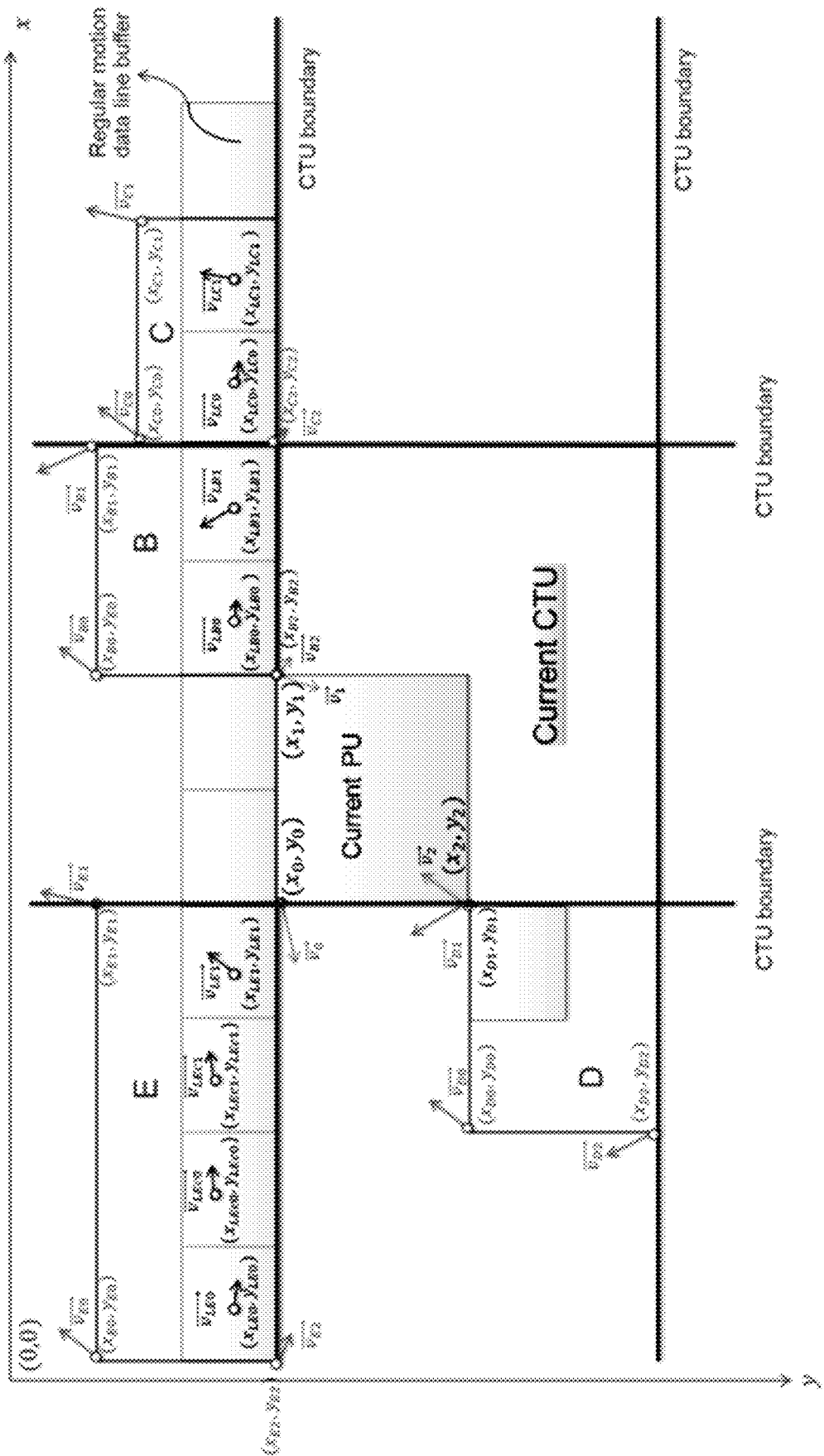
FIG. 9A is an illustration of a shared motion data line buffer for affine merge and non-affine merge/skip mode, for an adaptive affine motion model, according to some implementations.

FIG. 9A is an illustration of a shared motion data line buffer for affine merge and non-affine merge/skip mode, for an adaptive affine motion model, according to some implementations. As shown in FIG. 9A, if the current PU selects a neighboring PU located at the top CTU boundary, e.g. PU E, as the source PU to inherit the affine motion data, then the derivation of control point vectors $\vec{v}_0$, $\vec{v}_1$ and $\vec{v}_2$ of the current PU may be implemented in two steps, according to the following implementation.

In the first step, the sub-block motion vectors used for motion compensation of the bottom-left and bottom-right sub-block of PU E, i.e. $\vec{v}_{LE0} = (v_{LE0x}, v_{LE0y})$ at sample position $(x_{LE0}, y_{LE0})$ and $\vec{v}_{LE1} = (v_{LE1x}, v_{LE1y})$ at the sample position $(x_{LE1}, v_{LE1})$ with are computed by using the 6-parameter affine motion model:

$$\begin{cases} v_{LE0x} = \frac{(v_{E1x} - v_{E0x})}{(x_{E1} - x_{E0})}(x_{LE0} - x_{E0}) + \frac{(v_{E2x} - v_{E0x})}{(y_{E2} - y_{E0})}(y_{LE0} - y_{E0}) + v_{E0x} \\ v_{LE0y} = \frac{(v_{E1y} - v_{E0y})}{(x_{E1} - x_{E0})}(x_{LE0} - x_{E0}) + \frac{(v_{E2y} - v_{E0y})}{(y_{E2} - y_{E0})}(y_{LE0} - y_{E0}) + v_{E0y} \end{cases} \quad \text{Equation 40}$$

$$\begin{cases} v_{LE1x} = \frac{(v_{E1x} - v_{E0x})}{(x_{E1} - x_{E0})}(x_{LE1} - x_{E0}) + \frac{(v_{E2x} - v_{E0x})}{(y_{E2} - y_{E0})}(y_{LE1} - y_{E0}) + v_{E0x} \\ v_{LE1y} = \frac{(v_{E1y} - v_{E0y})}{(x_{E1} - x_{E0})}(x_{LE1} - x_{E0}) + \frac{(v_{E2y} - v_{E0y})}{(y_{E2} - y_{E0})}(y_{LE1} - y_{E0}) + v_{E0y} \end{cases} \quad \text{Equation 41}$$

Furthermore, if the neighboring PU E is wide enough, then additional sub-block vectors may be already stored in the regular motion data line buffer. For example, if the PU E has a width larger than or equal to 16 samples, and the sub-block width is 4 samples, then at least 4 bottom sub-block vectors of PU E are stored in the regular motion data line buffer. As shown in FIG. 9A, in this case the sub-block vectors at bottom center positions of the neighboring PU E $(\vec{v}_{LEc0} = (v_{LEc0x}, v_{LEc0y})$ at sample position $(x_{LEc0}, v_{LEc0})$ and $\vec{v}_{LEc1} = (v_{LEc1x}, v_{LEc1y})$ at the sample position $(x_{LEc1}, v_{LEc1})$ with $y_{LEc1} = y_{LEc0}$) are computed by using the 6-parameter affine motion model:

$$\begin{cases} v_{LEc0x} = \frac{(v_{E1x} - v_{E0x})}{(x_{E1} - x_{E0})}(x_{LEc0} - x_{E0}) + \frac{(v_{E2x} - v_{E0x})}{(y_{E2} - y_{E0})}(y_{LEc0} - y_{E0}) + v_{E0x} \\ v_{LEc0y} = \frac{(v_{E1y} - v_{E0y})}{(x_{E1} - x_{E0})}(x_{LEc0} - x_{E0}) + \frac{(v_{E2y} - v_{E0y})}{(y_{E2} - y_{E0})}(y_{LEc0} - y_{E0}) + v_{E0y} \end{cases} \quad \text{Equation 42}$$

-continued $$\begin{cases} v_{LEc1x} = \frac{(v_{E1x} - v_{E0x})}{(x_{E1} - x_{E0})}(x_{LEc1} - x_{E0}) + \frac{(v_{E2x} - v_{E0x})}{(y_{E2} - y_{E0})}(y_{LEc1} - y_{E0}) + v_{E0x} \\ v_{LEc1y} = \frac{(v_{E1y} - v_{E0y})}{(x_{E1} - x_{E0})}(x_{LEc1} - x_{E0}) + \frac{(v_{E2y} - v_{E0y})}{(y_{E2} - y_{E0})}(y_{LEc1} - y_{E0}) + v_{E0y} \end{cases}$$ Equation 43

In the second step, the control point vectors $\vec{v}_0$, $\vec{v}_1$ and $\vec{v}_2$ of the current PU coded in affine merge mode are derived by using the 6-parameter affine motion model, and by $$\begin{cases} v_{0x} = \frac{(v_{LE1x} - v_{LE0x})}{(x_{LE1} - x_{LE0})}(x_0 - x_{LE0}) + \frac{(v_{LE1x} + v_{LE0x} - v_{LEc1x} - v_{LEc0x})}{2(y_{LE1} - y_{LEc1})}(y_0 - y_{LE0}) + v_{LE0x} \\ v_{0y} = \frac{(v_{LE1y} - v_{LE0y})}{(x_{LE1} - x_{LE0})}(x_0 - x_{LE0}) + \frac{(v_{LE1y} + v_{LE0y} - v_{LEc1y} - v_{LEc0y})}{2(y_{LE1} - y_{LEc1})}(y_0 - y_{LE0}) + v_{LE0y} \end{cases}$$ Eq. 44

$$\begin{cases} v_{1x} = \frac{(v_{LE1x} - v_{LE0x})}{(x_{LE1} - x_{LE0})}(x_1 - x_{LE0}) + \frac{(v_{LE1x} + v_{LE0x} - v_{LEc1x} - v_{LEc0x})}{2(y_{LE1} - y_{LEc1})}(y_1 - y_{LE0}) + v_{LE0x} \\ v_{1y} = \frac{(v_{LE1y} - v_{LE0y})}{(x_{LE1} - x_{LE0})}(x_1 - x_{LE0}) + \frac{(v_{LE1y} + v_{LE0y} - v_{LEc1y} - v_{LEc0y})}{2(y_{LE1} - y_{LEc1})}(y_1 - y_{LE0}) + v_{LE0y} \end{cases}$$ Eq. 45

$$\begin{cases} v_{2x} = \frac{(v_{LE1x} - v_{LE0x})}{(x_{LE1} - x_{LE0})}(x_2 - x_{LE0}) + \frac{(v_{LE1x} + v_{LE0x} - v_{LEc1x} - v_{LEc0x})}{2(y_{LE1} - y_{LEc1})}(y_2 - y_{LE0}) + v_{LE0x} \\ v_{2y} = \frac{(v_{LE1y} - v_{LE0y})}{(x_{LE1} - x_{LE0})}(x_2 - x_{LE0}) + \frac{(v_{LE1y} + v_{LE0y} - v_{LEc1y} - v_{LEc0y})}{2(y_{LE1} - y_{LEc1})}(y_2 - y_{LE0}) + v_{LE0y} \end{cases}$$ Eq. 46

Note that the selection of sub-block vector sample location must satisfy the following conditions to make the 6-parameter affine motion model based inheritance work.

$$\begin{cases} y_{LE1} = y_{LE0} \\ y_{LEc1} = y_{LEc0} \\ y_{LE1} \neq y_{LEc1} \\ x_{LE0} + x_{LE1} = x_{LEc0} + x_{LEc1} \end{cases}$$ Equation 47

If the selected neighboring PU is located at the top CTU boundary but PU is not wide enough. For example, if PU E has a width of 8 samples, and the sub-block width is 4 samples, then only 2 bottom sub-block vectors of PU E, i.e. $\vec{v}_{LE0}=(v_{LE0x},v_{LE0y})$ and $\vec{v}_{LE1}=(v_{LE1x},v_{LE1y})$, can be stored in the regular motion data line buffer. In this case, the 4-parameter motion model as described in Equations 34, 35 and 36 are used to derive the control point vectors $\vec{v}_0$, $\vec{v}_1$ and $\vec{v}_2$ and of the current PU. In some of implementations, the current PU may be treated using the 4-parameter affine motion model, though it inherits the affine motion data from a neighboring PU using 6-parameter affine motion model. For example, in some such implementations, the control point vectors of the $\vec{v}_0$, $\vec{v}_1$ of the current PU are derived by using Equations 34 and 35. In other implementations, the inheritance of affine motion data in this case may be simply disabled for the current PU.

If the selected neighboring PU is not located at the top CTU boundary—for example, if PU D in FIG. 9A is the selected neighboring PU for the current PU coded in affine merge mode—then the $\vec{v}_0$, $\vec{v}_1$ and $\vec{v}_2$ of the current PU may be derived by directly using the neighboring control point vectors, e.g. using $\vec{v}_{D0}=(v_{D0x},v_{D0y})$ at the top-left sample position $(x_{D0},v_{D0})$, $\vec{v}_{D1}=(v_{D1x},v_{D1y})$ at the top-right sample position $(x_{D1},y_{D1})$ and $\vec{v}_{D2}=(v_{D2x},v_{D2y})$ at the bottom-left sample position $(x_{D1},y_{D1})$ of the neighboring PU D, as described in Equation 37, 38 and 39.

Figure 9B:
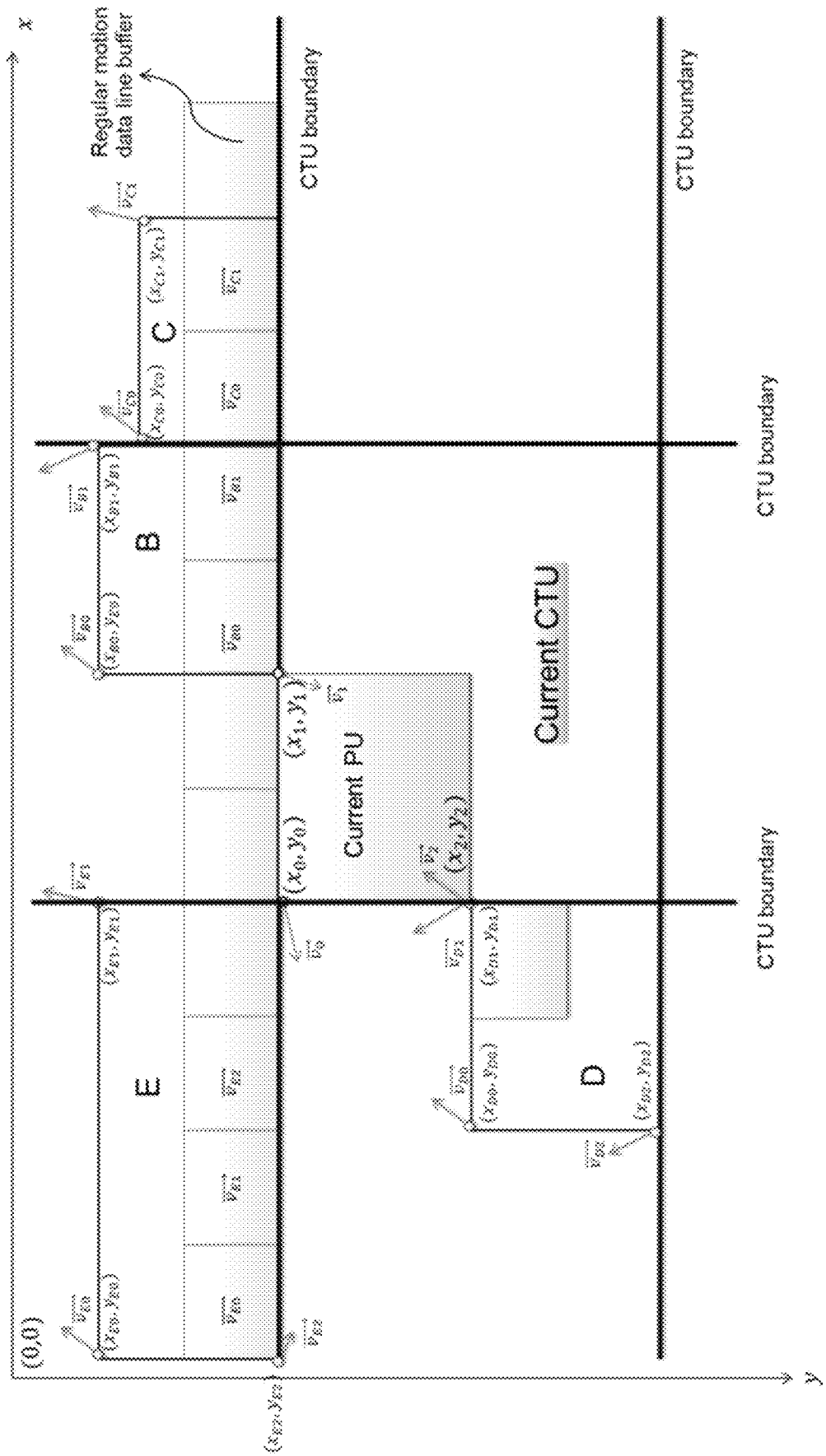
FIG. 9B is an illustration of a shared motion data line buffer for affine merge and non-affine merge/skip mode, with control point vectors stored in a regular motion data line buffer, according to some implementations.

In some implementations, the control point vectors and PU sizes of the neighboring PUs, which are located along the top CTU boundary and coded in affine mode, may be directly stored in the regular motion data line buffer to avoid the need of using a separate line buffer to buffer the control point vectors and PU sizes of those PUs. FIG. 9B is an illustration of a shared motion data line buffer for affine merge and non-affine merge/skip mode, with control point vectors stored in a regular motion data line buffer, according to some implementations. As shown in FIG. 9B, the current PU uses a 6-parameter affine motion model, while the neighboring PUs along the top CTU boundary (e.g. PU E, B, C) may use the 6-parameter or 4-parameter affine motion models. The associated control point vectors (e.g. $\vec{v}_{E0}$, $\vec{v}_{E1}$ and $\vec{v}_{E2}$ of PU E, $\vec{v}_{B0}$ and $\vec{vE}_{B1}$ of PUB, and $\vec{v}_{B0}$ and $\vec{v}_{B0}$ and $\vec{v}_{B1}$ of PU C) are directly stored in the regular motion data line buffer.

With the control point vectors stored in the regular motion data line buffer, the affine motion data inheritance is straightforward. In this embodiment, it makes no difference whether the selected PU is along the top CTU boundary or not. For example, if the current PU inherits the affine motion data from PU E in FIG. 9B, and PU E uses the 6 parameter model, then the control point vectors $\vec{v}_0$, $\vec{v}_1$ (and $\vec{v}_2$) of the current PU coded in affine merge mode can be derived by:

$$\begin{cases} v_{0x} = \frac{(v_{E1x} - v_{E0x})}{(x_{E1} - x_{E0})}(x_0 - x_{E0}) + \frac{(v_{E2x} - v_{E0x})}{(y_{E2} - y_{E0})}(y_0 - y_{E0}) + v_{E0x} \\ v_{0y} = \frac{(v_{E1y} - v_{E0y})}{(x_{E1} - x_{E0})}(x_0 - x_{E0}) + \frac{(v_{E2y} - v_{E0y})}{(y_{E2} - y_{E0})}(y_0 - y_{E0}) + v_{E0y} \end{cases} \quad \text{Equation 48}$$

$$\begin{cases} v_{1x} = \frac{(v_{E1x} - v_{E0x})}{(x_{E1} - x_{E0})}(x_1 - x_{E0}) + \frac{(v_{E2x} - v_{E0x})}{(y_{E2} - y_{E0})}(y_1 - y_{E0}) + v_{E0x} \\ v_{1y} = \frac{(v_{E1y} - v_{E0y})}{(x_{E1} - x_{E0})}(x_1 - x_{E0}) + \frac{(v_{E2y} - v_{E0y})}{(y_{E2} - y_{E0})}(y_1 - y_{E0}) + v_{E0y} \end{cases} \quad \text{Equation 49}$$

And if the current PU uses 6-parameter affine motion model, by:

$$\begin{cases} v_{2x} = \frac{(v_{E1x} - v_{E0x})}{(x_{E1} - x_{E0})}(x_2 - x_{E0}) + \frac{(v_{E2x} - v_{E0x})}{(y_{E2} - y_{E0})}(y_2 - y_{E0}) + v_{E0x} \\ v_{2y} = \frac{(v_{E1y} - v_{E0y})}{(x_{E1} - x_{E0})}(x_2 - x_{E0}) + \frac{(v_{E2y} - v_{E0y})}{(y_{E2} - y_{E0})}(y_2 - y_{E0}) + v_{E0y} \end{cases} \quad \text{Equation 50}$$

Likewise, if PU E uses the 4-parameter affine motion model, then the control point vectors $\vec{v}_0$, $\vec{v}_1$ (and $\vec{v}_2$) of the current PU coded in affine merge can be derived by:

$$\begin{cases} v_{0x} = \frac{(v_{E1x} - v_{E0x})}{(x_{E1} - x_{E0})}(x_0 - x_{E0}) - \frac{(v_{E1y} - v_{E0y})}{(x_{E1} - x_{E0})}(y_0 - y_{E0}) + v_{E0x} \\ v_{0y} = \frac{(v_{E1y} - v_{E0y})}{(x_{E1} - x_{E0})}(x_0 - x_{E0}) + \frac{(v_{E1x} - v_{E0x})}{(x_{E1} - x_{E0})}(y_0 - y_{E0}) + v_{E0y} \end{cases} \quad \text{Equation 51}$$

$$\begin{cases} v_{1x} = \frac{(v_{E1x} - v_{E0x})}{(x_{E1} - x_{E0})}(x_1 - x_{E0}) - \frac{(v_{E1y} - v_{E0y})}{(x_{E1} - x_{E0})}(y_1 - y_{E0}) + v_{E0x} \\ v_{1y} = \frac{(v_{E1y} - v_{E0y})}{(x_{E1} - x_{E0})}(x_1 - x_{E0}) + \frac{(v_{E1x} - v_{E0x})}{(x_{E1} - x_{E0})}(y_1 - y_{E0}) + v_{E0y} \end{cases} \quad \text{Equation 52}$$

And if the current PU uses 6-parameter affine motion model, by:

$$\begin{cases} v_{2x} = \frac{(v_{E1x} - v_{E0x})}{(x_{E1} - x_{E0})}(x_2 - x_{E0}) - \frac{(v_{E1y} - v_{E0y})}{(x_{E1} - x_{E0})}(y_2 - y_{E0}) + v_{E0x} \\ v_{2y} = \frac{(v_{E1y} - v_{E0y})}{(x_{E1} - x_{E0})}(x_2 - x_{E0}) + \frac{(v_{E1x} - v_{E0x})}{(x_{E1} - x_{E0})}(y_2 - y_{E0}) + v_{E0y} \end{cases} \quad \text{Equation 53}$$

Figure 9C:
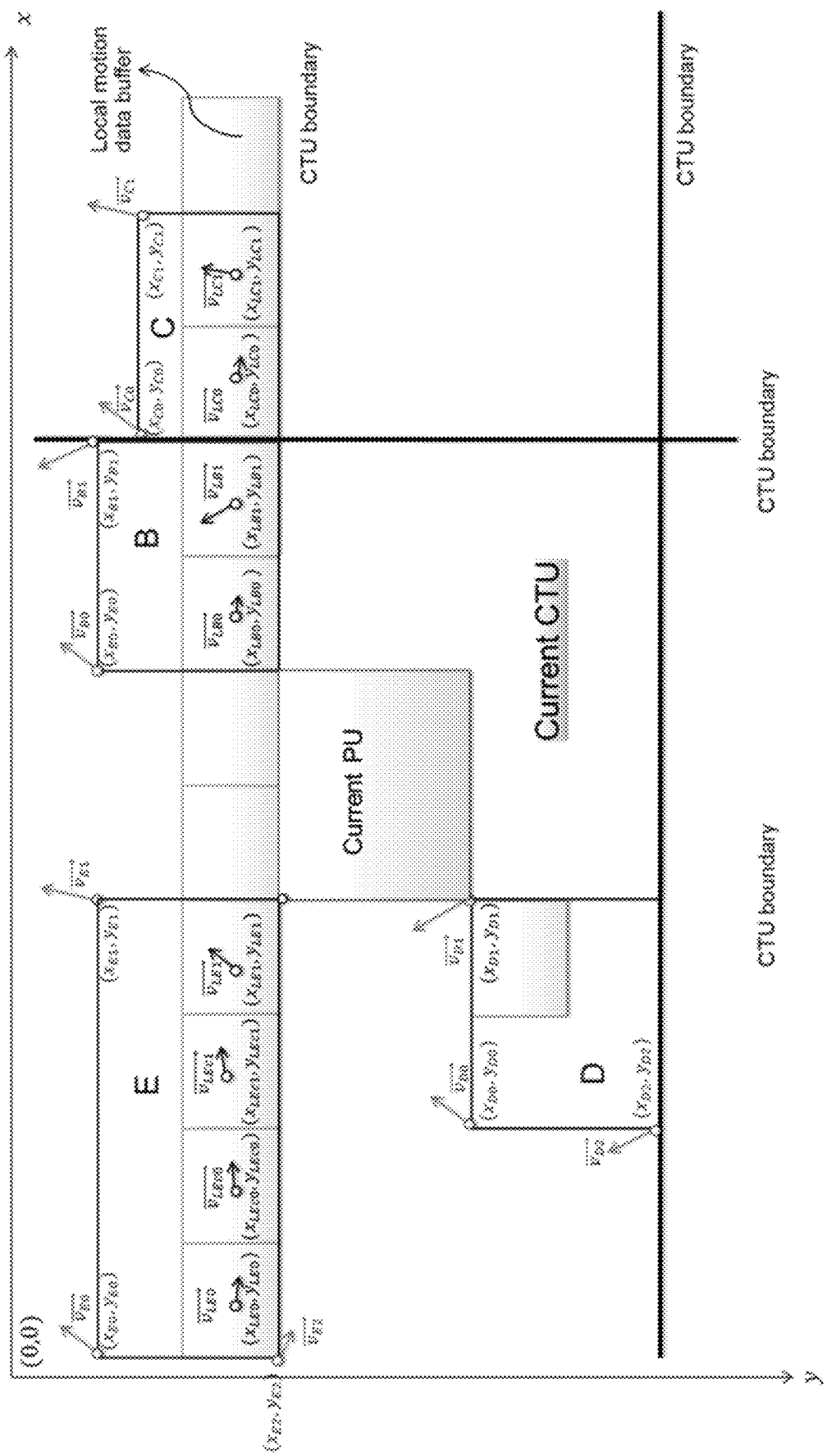
FIG. 9C is an illustration of a shared motion data line buffer for affine merge and non-affine merge/skip utilizing a local motion data buffer, according to some implementations.

For the merge/skip, AMVP and affine AMVP list derivation of the current PU, spatial neighboring sub-block motion vectors may be used, but they are not readily stored in the regular motion data line buffer in many implementations. Instead, a local motion data buffer for a CTU is installed to buffer the bottom sub-block vectors of the PUs along the top CTU boundary. If a neighboring PU along the top CTU boundary uses affine mode, the bottom sub-block vectors are computed by using the control point vectors stored in the regular motion line buffer. FIG. 9C is an illustration of a shared motion data line buffer for affine merge and non-affine merge/skip utilizing a local motion data buffer, according to some implementations. In FIG. 9C, for example, if PU E uses 6-parameter affine motion model, the bottom sub-block vectors of PU E, e.g. $\vec{v}_{LE0} = (v_{LE0x}, v_{LE0y})$ at sample position $(x_{LE0}, y_{LE0})$, etc., may be computed by using the 6-parameter affine motion model and stored in the local motion buffer:

$$\begin{cases} v_{LE0x} = \frac{(v_{E1x} - v_{E0x})}{(x_{E1} - x_{E0})}(x_{LE0} - x_{E0}) + \frac{(v_{E2x} - v_{E0x})}{(y_{E2} - y_{E0})}(y_{LE0} - y_{E0}) + v_{E0x} \\ v_{LE0y} = \frac{(v_{E1y} - v_{E0y})}{(x_{E1} - x_{E0})}(x_{LE0} - x_{E0}) + \frac{(v_{E2y} - v_{E0y})}{(y_{E2} - y_{E0})}(y_{LE0} - y_{E0}) + v_{E0y} \end{cases} \quad \text{Equation 54}$$

Likewise, if PU E uses 4-parameter affine motion model, sub-block vectors, e.g. $\vec{v_{LE0}} = (v_{LE0x}, v_{LE0y})$ at sample position $(x_{LE0}, y_{LE0})$ and etc., may be computed by using the 4-parameter affine motion model and stored in the local motion data buffer:

$$\begin{cases} v_{LE0x} = \frac{(v_{E1x} - v_{E0x})}{(x_{E1} - x_{E0})}(x_{LE0} - x_{E0}) - \frac{(v_{E1y} - v_{E0y})}{(x_{E1} - x_{E0})}(y_{LE0} - y_{E0}) + v_{E0x} \\ v_{LE0y} = \frac{(v_{E1y} - v_{E0y})}{(x_{E1} - x_{E0})}(x_{LE0} - x_{E0}) + \frac{(v_{E1x} - v_{E0x})}{(x_{E1} - x_{E0})}(y_{LE0} - y_{E0}) + v_{E0y} \end{cases}$$

Equation 55

In such embodiments, the current PU uses sub-block vectors stored in the local motion data buffer (instead of the regular motion line buffer, which stores control point vectors) for the merge/skip, AMVP and affine AMVP list derivation. The derived sub-block vectors of PUs coded in affine mode may also be stored as temporal motion vectors for use of future pictures.

In some implementations, the 6-parameter affine mode may be disabled for PUs of small PU width so that the regular motion data line buffer has enough space to store control point vectors. For example, if the sub-block width is 4, then the 6-parameter affine mode may be disabled for PUs of width less than or equal to 8 samples. For example, in some implementations, for a PU with width of 8, only two sub-block slots are available in the regular motion data line buffer for the PU to store control point vectors, but the PU coded in the 6-parameter affine mode needs to store 3 control point vectors. Disabling the 6-parameter affine mode may be used to address lower width PUs.

Figure 10:
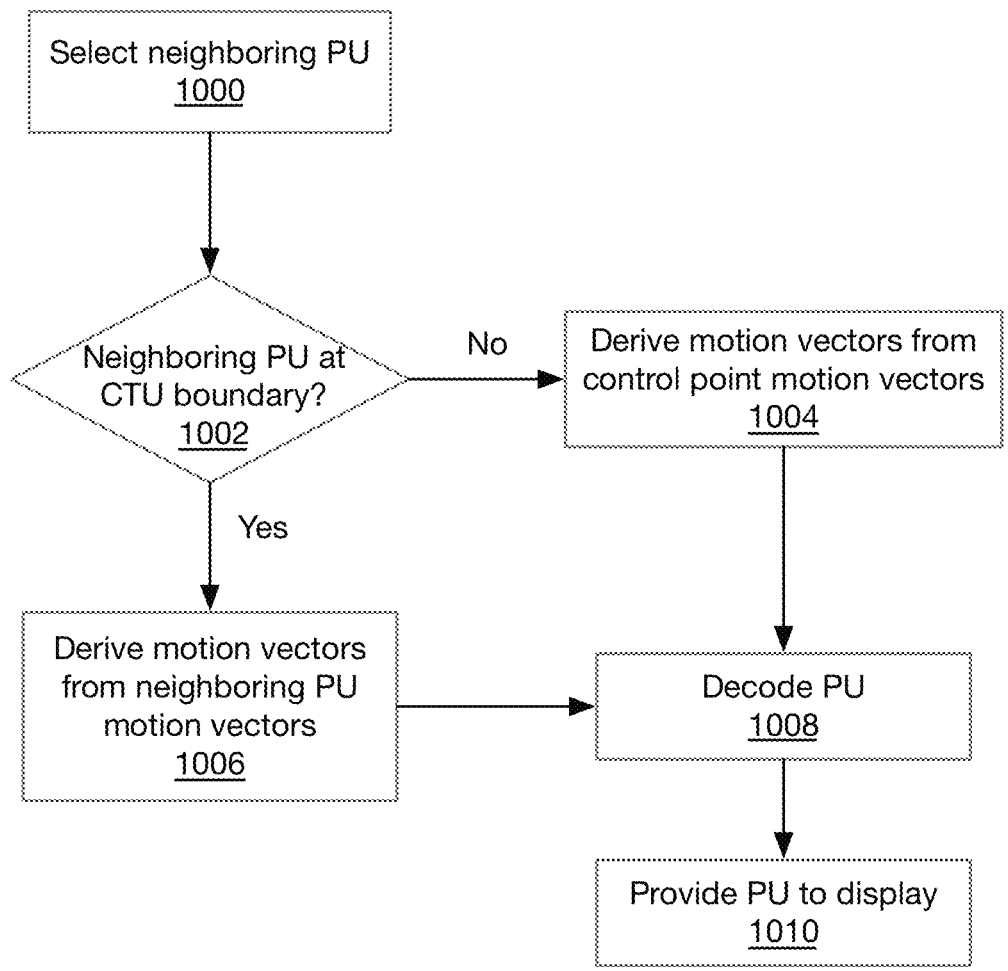
FIG. 10 is a flow chart of a method for decoding video via an adaptive affine motion model, according to some implementations.

FIG. 10 is a flow chart of a method for decoding video via an adaptive affine motion model, according to some implementations. During decoding of a prediction unit of a coding unit, as discussed above, at step 1000 the decoder may select one or more neighboring prediction units as motion vector references. As discussed above, in some implementations, the selected neighboring prediction unit may be at the top boundary of the current coding tree unit (CTU). The decoder may determine this by, in some implementations, determining if a sum of a y component of a luma location specifying a top-left sample of the neighboring luma coding block relative to the top left luma sample of the current picture (yNb) and a height of the neighboring luma coding block (nNbH) modulo an vertical array size of the luma coding tree block in samples (CtbSizeY) is equal to zero (e.g. ((yNb+nNbH) % CtbSizeY)=0). If it is, then the decoder may also determine if the sum of yNb and nNbH is equal to a y component of a luma location specifying the top-left sample of the current coding block relative to the top-left luma sample of the current picture (yCb) (i.e. yNb+nNbH=yCb). If so, then the neighboring luma coding block is at the top boundary of the current coding tree unit.

If the neighboring luma coding block is not at the top boundary of the current coding tree unit, at step 1004, the decoder may determine sub-block motion vectors based on control point motion vectors. Conversely, if the neighboring luma coding block is at the top boundary of the current coding tree unit, then, at step 1006, the decoder may determine sub-block motion vectors based on the neighboring sub-block vectors that are stored in the regular motion data line buffer. In some implementations, this derivation of sub-block motion vectors based on neighboring sub-block vectors may be done via the calculation of equations 34-36 discussed above, or any of the similar sets of equations above, depending on implementation.

Once motion vectors have been derived, in some implementations, at step 1008, the prediction unit may be decoded as discussed above. At step 1010, the prediction unit may be provided as an output of the decoder (e.g. as part of a reconstructed picture for display).

Accordingly, the systems and methods discussed herein provide for significant reduction in memory utilization while providing high efficiency derivation of motion data for affine merge mode. In a first aspect, the present disclosure is directed to a method for reduced memory utilization for motion data derivation in encoded video. The method includes determining, by a video decoder of a device from an input video bitstream, one or more control point motion vectors of a first prediction unit of a first coding tree unit, based on a plurality of motion vectors of a second one or more prediction units neighboring the first prediction unit stored in a motion data line buffer of the device. The method also includes decoding, by the video decoder, one or more sub-blocks of the first prediction unit based on the determined one or more control point motion vectors.

In some implementations, the second one or more prediction units are from a second coding tree unit neighboring the first coding tree unit. In a further implementation, the second one or more prediction units are located at a top boundary of the first coding tree unit. In a still further implementation, the motion vectors of the second one or more prediction units are stored in the motion data line buffer of the device during decoding of the first coding tree unit. In another further implementation, the method includes deriving the one or more control point motion vectors of the first prediction unit proportional to an offset between a sample position of the first prediction unit and a sample position of the second one or more prediction units. In yet another further implementation, the method includes determining, by the video decoder, a second one or more control point motion vectors of another prediction unit of the first coding tree unit based on control point motion vectors, responsive to a third one or more prediction units neighboring the another prediction unit not being located at a top boundary of the first coding tree unit; and decoding, by the video decoder, one or more sub-blocks of the another prediction unit based on the determined second one or more control point motion vectors In some implementations, the method includes calculating a difference between a control point motion vector and motion data of the second one or more prediction units neighboring the first prediction unit. In some implementations, the method includes calculating an offset from the motion data of the second one or more prediction units neighboring the first prediction unit based on a height or width of the corresponding second one or more prediction units. In a further implementation, an identification the height or width of the corresponding second one or more prediction units is stored in an affine motion data line buffer.

In some implementations, the method includes deriving sub-block motion data of the one or more sub-blocks based on the determined one or more control point motion vectors. In some implementations, the method includes providing, by the video decoder to a display device, the decoded one or more sub-blocks of the first prediction unit.

In another aspect, the present disclosure is directed to a system for reduced memory utilization for motion data derivation in encoded video. The system includes a motion data line buffer; and a video decoder, configured to: determine, device from an input video bitstream, one or more control point motion vectors of a first prediction unit of a first coding tree unit, based on a plurality of motion vectors of a second one or more prediction units neighboring the first prediction unit stored in the motion data line buffer, and decode one or more sub-blocks of the first prediction unit based on the determined one or more control point motion vectors.

In some implementations, the second one or more prediction units are from a second coding tree unit neighboring the first coding tree unit. In some implementations, the second one or more prediction units are located at a top boundary of the first coding tree unit. In a further implementation, the motion vectors of the second one or more prediction units are stored in the motion data line buffer of the device during decoding of the first coding tree unit. In another implementation, the decoder is further configured to derive the one or more control point motion vectors of the first prediction unit proportional to an offset between a sample position of the first prediction unit and a sample position of the second one or more prediction units. In another implementation, the decoder is further configured to: determine a second one or more control point motion vectors of another prediction unit of the first coding tree unit based on control point motion vectors, responsive to a third one or more prediction units neighboring the another prediction unit not being located at a top boundary of the first coding tree unit; and decode one or more sub-blocks of the another prediction unit based on the determined second one or more control point motion vectors.

In some implementations, the decoder is further configured to calculate a difference between a control point motion vector and motion data of the second one or more prediction units neighboring the first prediction unit. In some implementations, the decoder is further configured to calculate an offset from the motion data of the second one or more prediction units neighboring the first prediction unit based on a height or width of the corresponding second one or more prediction units. In some implementations, the system includes an affine motion data line buffer configured to store an identification the height or width of the corresponding second one or more prediction units.

In some implementations, the decoder is further configured to derive sub-block motion data of the one or more sub-blocks based on the determined one or more control point motion vectors. In some implementations, the decoder is further configured to provide, to a display device, the decoded one or more sub-blocks of the first prediction unit.

B. Computing and Network Environment

Figure 11A:
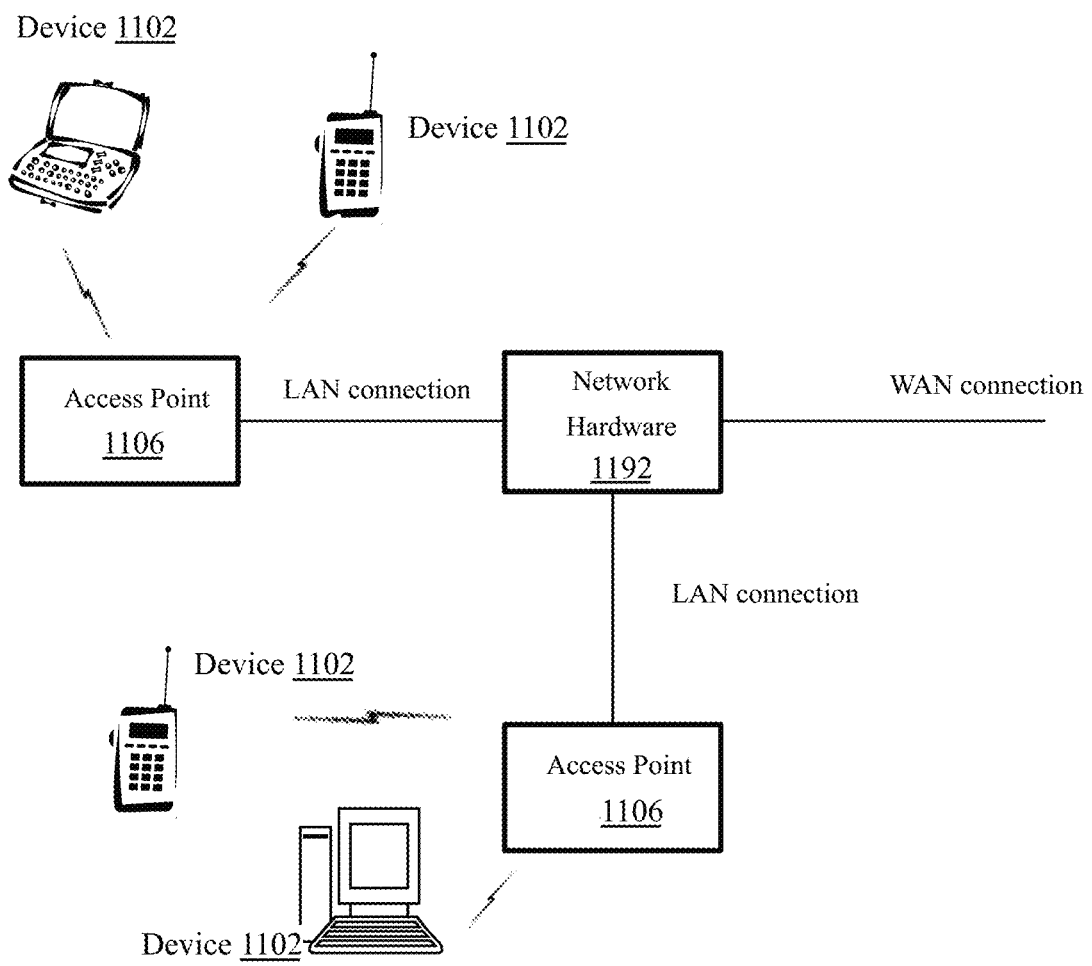
FIG. 11A is a block diagram depicting an embodiment of a network environment.

Having discussed specific embodiments of the present solution, it may be helpful to describe aspects of the operating environment as well as associated system components (e.g., hardware elements) in connection with the methods and systems described herein. Referring to FIG. 11A, an embodiment of a network environment is depicted. In brief overview, the network environment includes a wireless communication system that includes one or more access points 1106, one or more wireless communication devices 1102 and a network hardware component 1192. The wireless communication devices 1102 may for example include laptop computers 1102, tablets 1102, personal computers 1102 and/or cellular telephone devices 1102. The details of an embodiment of each wireless communication device and/or access point are described in greater detail with reference to FIGS. 11B and 11C. The network environment can be an ad hoc network environment, an infrastructure wireless network environment, a subnet environment, etc. in one embodiment The access points (APs) 1106 may be operably coupled to the network hardware 1192 via local area network connections. The network hardware 1192, which may include a router, gateway, switch, bridge, modem, system controller, appliance, etc., may provide a local area network connection for the communication system. Each of the access points 1106 may have an associated antenna or an antenna array to communicate with the wireless communication devices 1102 in its area. The wireless communication devices 1102 may register with a particular access point 1106 to receive services from the communication system (e.g., via a SU-MIMO or MU-MIMO configuration). For direct connections (e.g., point-to-point communications), some wireless communication devices 1102 may communicate directly via an allocated channel and communications protocol. Some of the wireless communication devices 1102 may be mobile or relatively static with respect to the access point 1106.

In some embodiments an access point 1106 includes a device or module (including a combination of hardware and software) that allows wireless communication devices 1102 to connect to a wired network using Wi-Fi, or other standards. An access point 1106 may sometimes be referred to as a wireless access point (WAP). An access point 1106 may be configured, designed and/or built for operating in a wireless local area network (WLAN). An access point 1106 may connect to a router (e.g., via a wired network) as a standalone device in some embodiments. In other embodiments, an access point can be a component of a router. An access point 1106 can provide multiple devices 1102 access to a network. An access point 1106 may, for example, connect to a wired Ethernet connection and provide wireless connections using radio frequency links for other devices 1102 to utilize that wired connection. An access point 1106 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 1106 may be used for (e.g., in-home or in-building) wireless networks (e.g., IEEE 802.11, Bluetooth, ZigBee, any other type of radio frequency based network protocol and/or variations thereof). Each of the wireless communication devices 1102 may include a built-in radio and/or is coupled to a radio. Such wireless communication devices 1102 and/or access points 1106 may operate in accordance with the various aspects of the disclosure as presented herein to enhance performance, reduce costs and/or size, and/or enhance broadband applications. Each wireless communication devices 1102 may have the capacity to function as a client node seeking access to resources (e.g., data, and connection to networked nodes such as servers) via one or more access points 1106.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 11B:
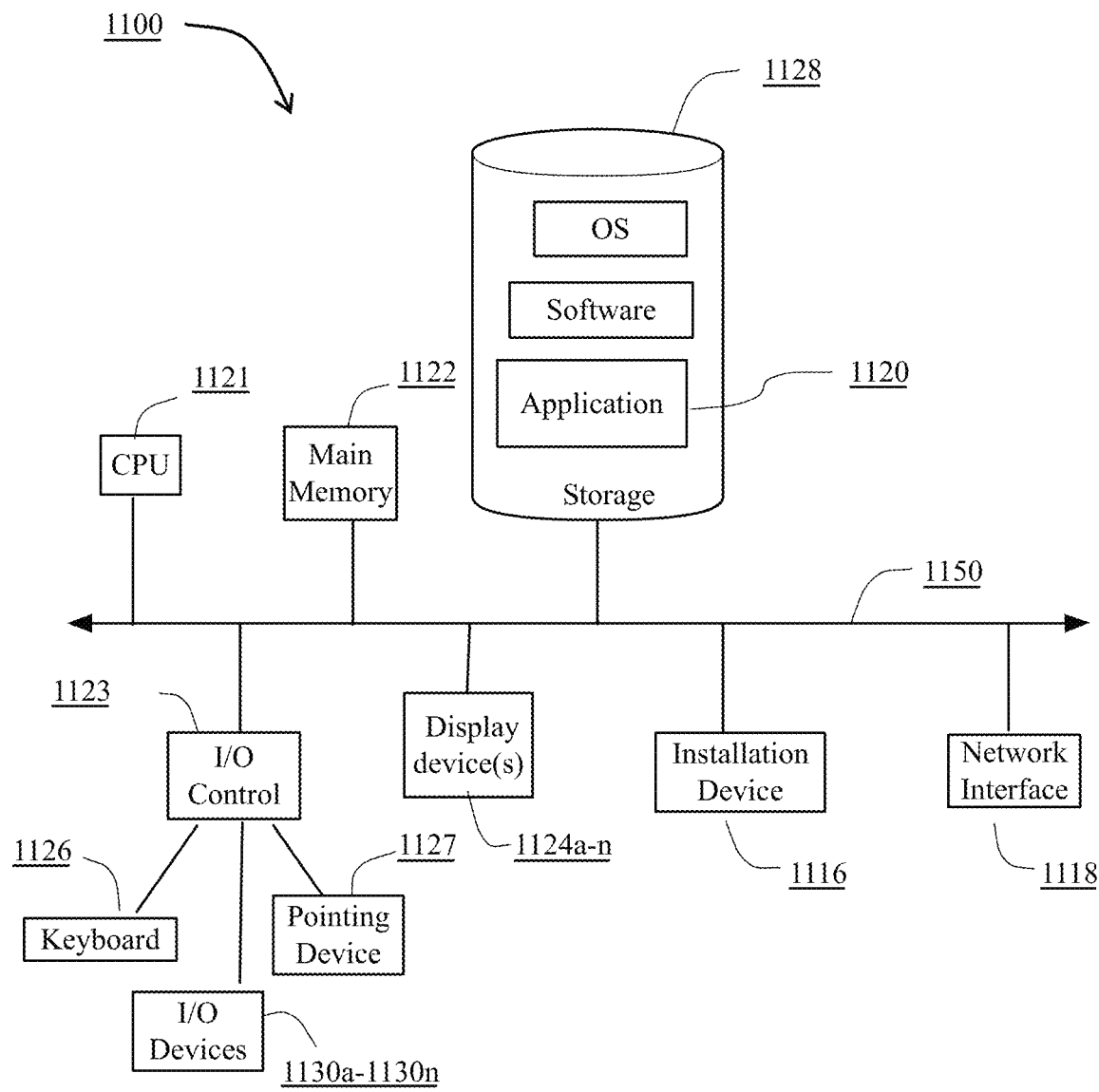
FIGS. 11B and 11C are block diagrams depicting embodiments of computing devices useful in connection with the methods and systems described herein.
Figure 11C:
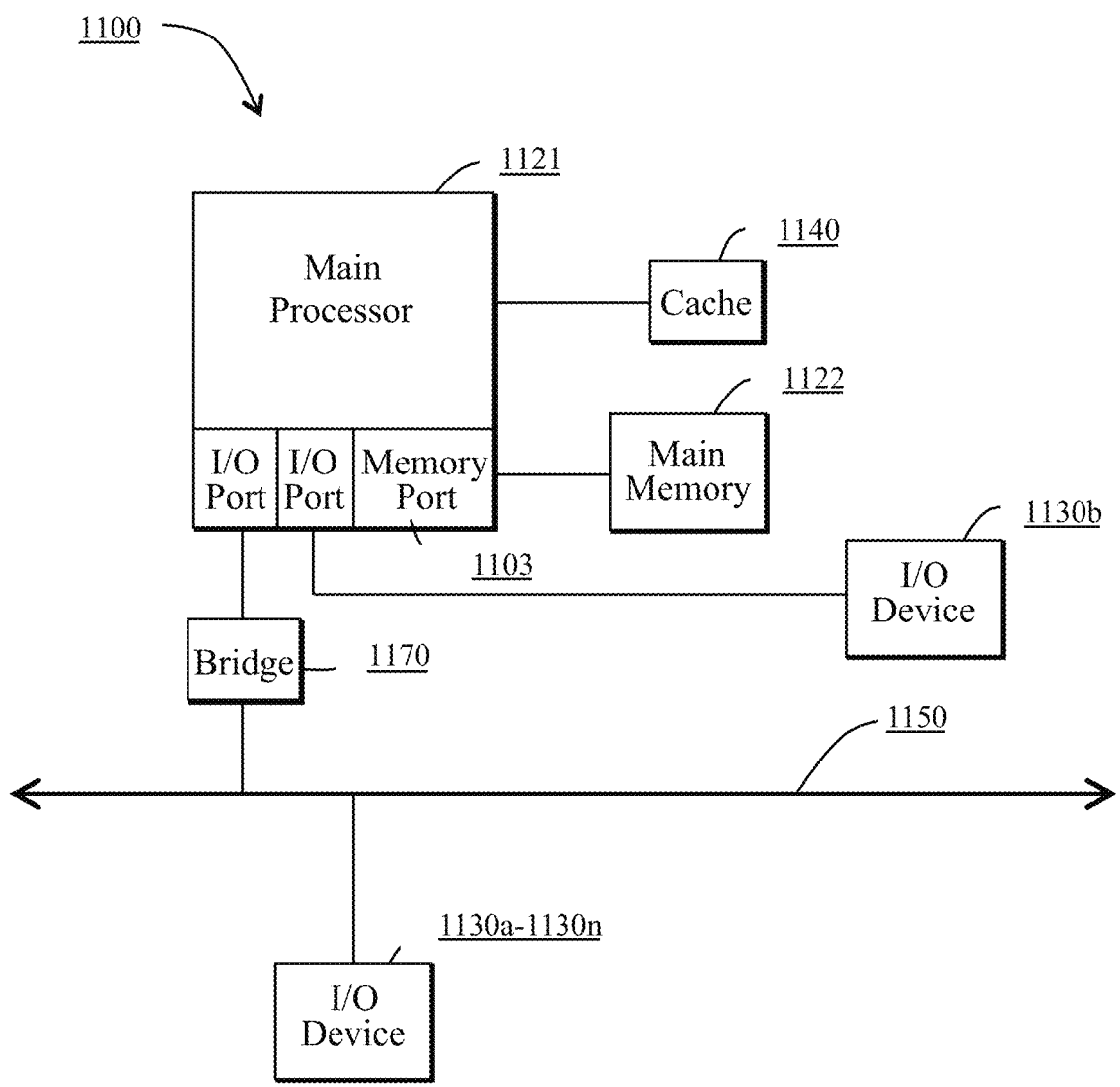

The communications device(s) 1102 and access point(s) 1106 may be deployed as and/or executed on any type and form of computing device, such as a computer, network device or appliance capable of communicating on any type and form of network and performing the operations described herein. FIGS. 11B and 11C depict block diagrams of a computing device 1100 useful for practicing an embodiment of the wireless communication devices 1102 or the access point 1106. As shown in FIGS. 11B and 11C, each computing device 1100 includes a central processing unit 1121, and a main memory unit 1122. As shown in FIG. 11B, a computing device 1100 may include a storage device 1128, an installation device 1116, a network interface 1118, an I/O controller 1123, display devices 1124a-1124n, a keyboard 1126 and a pointing device 1127, such as a mouse. The storage device 1128 may include, without limitation, an operating system and/or software. As shown in FIG. 11C, each computing device 1100 may also include additional optional elements, such as a memory port 1103, a bridge 1170, one or more input/output devices 1130a-1130n (generally referred to using reference numeral 1130), and a cache memory 1140 in communication with the central processing unit 1121.

The central processing unit 1121 is any logic circuitry that responds to and processes instructions fetched from the main memory unit 1122. In many embodiments, the central processing unit 1121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 1100 may be based on any of these processors, or any other processor capable of operating as described herein.

Main memory unit 1122 may be one or more memory chips capable of storing data and allowing any storage location to be directly accessed by the microprocessor 1121, such as any type or variant of Static random access memory (SRAM), Dynamic random access memory (DRAM), Ferroelectric RAM (FRAM), NAND Flash, NOR Flash and Solid State Drives (SSD). The main memory 1122 may be based on any of the above described memory chips, or any other available memory chips capable of operating as described herein. In the embodiment shown in FIG. 11B, the processor 1121 communicates with main memory 1122 via a system bus 1150 (described in more detail below). FIG. 11C depicts an embodiment of a computing device 1100 in which the processor communicates directly with main memory 1122 via a memory port 1103. For example, in FIG. 11C the main memory 1122 may be DRDRAM.

Processor 1121 and/or main memory 1122 may be used for video encoding and/or decoding, as well as other video processing features (including processing of animations, slide shows, or other multimedia). For example, main memory 1122 may comprise memory buffers needed for a software/hardware codec for VVC encoding and/or decoding. Processor 1121 may comprise a software/hardware VVC encoder and/or decoder; communicate with a separate co-processor comprising a VVC encoder and/or decoder; and/or execute instructions for encoding and decoding media stored in main memory 1122.

FIG. 11C depicts an embodiment in which the main processor 1121 communicates directly with cache memory 1140 via a secondary bus, sometimes referred to as a backside bus. In other embodiments, the main processor 1121 communicates with cache memory 1140 using the system bus 1150. Cache memory 1140 typically has a faster response time than main memory 1122 and is provided by, for example, SRAM, BSRAM, or EDRAM. In the embodiment shown in FIG. 11C, the processor 1121 communicates with various I/O devices 1130 via a local system bus 1150. Various buses may be used to connect the central processing unit 1121 to any of the I/O devices 1130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1124, the processor 1121 may use an Advanced Graphics Port (AGP) to communicate with the display 1124. FIG. 11C depicts an embodiment of a computer 1100 in which the main processor 1121 may communicate directly with I/O device 1130b, for example via HYPERTRANSPORT, RAPIDIO, or INFINIBAND communications technology. FIG. 11C also depicts an embodiment in which local busses and direct communication are mixed: the processor 1121 communicates with I/O device 1130a using a local interconnect bus while communicating with I/O device 1130b directly.

A wide variety of I/O devices 1130a-1130n may be present in the computing device 1100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 1123 as shown in FIG. 11B. The I/O controller may control one or more I/O devices such as a keyboard 1126 and a pointing device 1127, e.g., a mouse or optical pen. Furthermore, an I/O device may also provide storage and/or an installation medium 1116 for the computing device 1100. In still other embodiments, the computing device 1100 may provide USB connections (not shown) to receive handheld USB storage devices such as the USB Flash Drive line of devices manufactured by Twintech Industry, Inc. of Los Alamitos, Calif.

Referring again to FIG. 11B, the computing device 1100 may support any suitable installation device 1116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1100 may further include a storage device, such as one or more hard disk drives or redundant arrays of independent disks, for storing an operating system and other related software, and for storing application software programs such as any program or software 1120 for implementing (e.g., configured and/or designed for) the systems and methods described herein. Optionally, any of the installation devices 1116 could also be used as the storage device. Additionally, the operating system and the software can be run from a bootable medium.

Furthermore, the computing device 1100 may include a network interface 1118 to interface to the network 1104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1100 communicates with other computing devices 1100' via any type and/or form of gateway or tunneling protocol such as Secure Socket Layer (SSL) or Transport Layer Security (TLS). The network interface 1118 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

In some embodiments, the computing device 1100 may include or be connected to one or more display devices 1124a-1124n. As such, any of the I/O devices 1130a-1130n and/or the I/O controller 1123 may include any type and/or form of suitable hardware, software, or combination of hardware and software to support, enable or provide for the connection and use of the display device(s) 1124a-1124n by the computing device 1100. For example, the computing device 1100 may include any type and/or form of video adapter, video card, driver, and/or library to interface, communicate, connect or otherwise use the display device(s) 1124a-1124n. In one embodiment, a video adapter may include multiple connectors to interface to the display device(s) 1124a-1124n. In other embodiments, the computing device 1100 may include multiple video adapters, with each video adapter connected to the display device(s) 1124a-1124n. In some embodiments, any portion of the operating system of the computing device 1100 may be configured for using multiple displays 1124a-1124n. One ordinarily skilled in the art will recognize and appreciate the various ways and embodiments that a computing device 1100 may be configured to have one or more display devices 1124a-1124n.

In further embodiments, an I/O device 1130 may be a bridge between the system bus 1150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1100 of the sort depicted in FIGS. 11B and 11C may operate under the control of an operating system, which control scheduling of tasks and access to system resources. The computing device 1100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 1100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1100 has sufficient processor power and memory capacity to perform the operations described herein.

In some embodiments, the computing device 1100 may have different processors, operating systems, and input devices consistent with the device. For example, in one embodiment, the computing device 1100 is a smart phone, mobile device, tablet or personal digital assistant. In still other embodiments, the computing device 1100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 1100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for reduced memory utilization for motion data derivation in encoded video, comprising:
   determining, by a video decoder of a device from an input video bitstream, one or more control point motion vectors of a first prediction unit of a first coding tree unit, based on a plurality of motion vectors of one or more second prediction units neighboring the first prediction unit stored in a motion data line buffer of the device, the one or more second prediction units from a second coding tree unit neighboring the first coding tree unit; and
   decoding, by the video decoder, one or more sub-blocks of the first prediction unit based on the determined one or more control point motion vectors.

2. The method of claim 1, wherein the one or more second prediction units are located at a top boundary of the first coding tree unit.

3. The method of claim 2, wherein the plurality of motion vectors of the one or more second prediction units are stored in the motion data line buffer of the device during decoding of the first coding tree unit.

4. The method of claim 3, further comprising deriving the one or more control point motion vectors of the first prediction unit proportional to an offset between a sample position of the first prediction unit and a sample position of the one or more second prediction units.

5. The method of claim 3, further comprising:
   determining, by the video decoder, one or more second control point motion vectors of another prediction unit of the first coding tree unit based on the one or more control point motion vectors, responsive to one or more third prediction units neighboring the another prediction unit not being located at the top boundary of the first coding tree unit; and
   decoding, by the video decoder, one or more sub-blocks of the another prediction unit based on the determined one or more second control point motion vectors.

6. The method of claim 1, wherein determining the one or more control point motion vectors further comprises calculating an offset from motion data of the one or more second prediction units neighboring the first prediction unit based on a height or width of the one or more second prediction units.

7. The method of claim 6, wherein an identification of the height or width of the one or more second prediction units is stored in an affine motion data line buffer.

8. The method of claim 1, wherein decoding the one or more sub-blocks of the first prediction unit based on the determined one or more control point motion vectors further comprises deriving sub-block motion data of the one or more sub-blocks based on the determined one or more control point motion vectors.

9. The method of claim 1, further comprising providing, by the video decoder to a display device, the decoded one or more sub-blocks of the first prediction unit.

10. A system for reduced memory utilization for motion data derivation in encoded video, comprising:
    a motion data line buffer; and
    a video decoder, configured to:
       determine, from an input video bitstream, one or more control point motion vectors of a first prediction unit of a first coding tree unit, based on a plurality of motion vectors of one or more second prediction units neighboring the first prediction unit stored in the motion data line buffer, the one or more second prediction units from a second coding tree unit neighboring the first coding tree unit, and
       decode one or more sub-blocks of the first prediction unit based on the determined one or more control point motion vectors.

11. The system of claim 10, wherein the one or more second prediction units are located at a top boundary of the first coding tree unit.

12. The system of claim 11, wherein the plurality of motion vectors of the one or more second prediction units are stored in the motion data line buffer during decoding of the first coding tree unit.

13. The system of claim 12, wherein the video decoder is further configured to derive the one or more control point motion vectors of the first prediction unit proportional to an offset between a sample position of the first prediction unit and a sample position of the one or more second prediction units.

14. The system of claim 12, wherein the video decoder is further configured to:
    determine one or more second control point motion vectors of another prediction unit of the first coding tree unit based on the one or more control point motion vectors, responsive to one or more third prediction units neighboring the another prediction unit not being located at the top boundary of the first coding tree unit, and
    decode one or more sub-blocks of the another prediction unit based on the determined one or more second control point motion vectors.

15. The system of claim 10, wherein the video decoder is further configured to calculate an offset from motion data of the one or more second prediction units neighboring the first prediction unit based on a height or width of the one or more second prediction units.

16. The system of claim 15, further comprising an affine motion data line buffer configured to store an identification of the height or width of the one or more second prediction units.

17. The system of claim 10, wherein the video decoder is further configured to derive sub-block motion data of the one or more sub-blocks based on the determined one or more control point motion vectors.

18. A method for reduced memory utilization for motion data derivation in encoded video, comprising:
    for a first prediction unit of a first coding tree unit of an input video bitstream, determining, by a video decoder of a device, whether one or more second prediction units neighboring the first prediction unit are located at a top boundary of the first coding tree unit, the one or more second prediction units stored in a motion data line buffer of the device;

either:
   (i) responsive to the one or more second prediction units being located at the top boundary of the first coding tree unit, deriving motion vectors for the first prediction unit from motion vectors of the one or more second prediction units, or
   (ii) responsive to the one or more second prediction units not being located at the top boundary of the first coding tree unit, deriving motion vectors for the first prediction unit from one or more control point motion vectors of the one or more second prediction units; and decoding, by the video decoder, one or more sub-blocks of the first prediction unit based on the derived motion vectors.

* * * * *